US011229977B2

(12) United States Patent
Agosti et al.

(10) Patent No.: US 11,229,977 B2
(45) Date of Patent: Jan. 25, 2022

(54) LASER HOT WIRE ADDITIVE DEPOSITION HEAD WITH OMNI-DIRECTIONAL BUILD PATH

(71) Applicant: Lincoln Global, Inc., Santa Fe Springs, CA (US)

(72) Inventors: Christopher D. Agosti, Mentor, OH (US); Michael D. Latessa, Chesterland, OH (US); William T. Matthews, Chesterland, OH (US); Kyle G. Smith, Willoughby, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 374 days.

(21) Appl. No.: 16/383,822

(22) Filed: Apr. 15, 2019

(65) Prior Publication Data
US 2020/0023468 A1 Jan. 23, 2020

Related U.S. Application Data

(60) Provisional application No. 62/700,398, filed on Jul. 19, 2018.

(51) Int. Cl.
*B23K 26/342* (2014.01)
*B23K 26/14* (2014.01)
(Continued)

(52) U.S. Cl.
CPC .......... *B23K 26/342* (2015.10); *B23K 26/064* (2015.10); *B23K 26/0853* (2013.01);
(Continued)

(58) Field of Classification Search
CPC ................ B23K 26/342; B23K 26/064; B23K 26/0853; B23K 26/1464; B23K 26/60; B23K 26/703; B23K 26/14
See application file for complete search history.

(56) References Cited

U.S. PATENT DOCUMENTS

| 4,532,406 A | 7/1985 | Povlick et al. |
| 6,600,133 B2 | 7/2003 | Wantanabe et al. |

(Continued)

FOREIGN PATENT DOCUMENTS

| CN | 2928355 Y | 8/2007 |
| CN | 106 312 304 A | 1/2017 |

(Continued)

OTHER PUBLICATIONS

Extended European Search Report from Corresponding Application No. 19187322.3; dated Nov. 25, 2019; pp. 1-8.
(Continued)

*Primary Examiner* — Geoffrey S Evans
(74) *Attorney, Agent, or Firm* — David J. Muzilla

(57) ABSTRACT

Embodiments of an integrated laser hot wire deposition head are disclosed. In one embodiment, the deposition head includes a structural frame, a laser process sub-system, a wire feeding device, and a contact tube. The laser process sub-system is mounted within the structural frame to deliver a single beam path laser beam in a longitudinally-oriented direction toward a substrate or a part to be additively manufactured. The wire feeding device and contact tube are mounted within the frame to feed a consumable filler wire toward the substrate or part at an angle with respect to the longitudinally-oriented direction. The deposition head can be moved omni-directionally with respect to the substrate or the part, under the guidance of a motion control system, to additively manufacture the part without having to angularly change an orientation of the single beam path laser beam from the longitudinally-oriented direction or rotate the deposition head.

17 Claims, 25 Drawing Sheets

(51) Int. Cl.
  *B23K 26/064* (2014.01)
  *B23K 26/60* (2014.01)
  *B23K 26/70* (2014.01)
  *B23K 26/08* (2014.01)

(52) U.S. Cl.
  CPC .......... *B23K 26/14* (2013.01); *B23K 26/1464* (2013.01); *B23K 26/60* (2015.10); *B23K 26/703* (2015.10)

(56) References Cited

U.S. PATENT DOCUMENTS

| | | | |
|---|---|---|---|
| 10,046,394 B2 | 8/2018 | Nasser et al. | |
| 10,046,419 B2 | 8/2018 | Denney et al. | |
| 2006/0042083 A1* | 3/2006 | Baker | B23K 26/342 29/889.1 |
| 2009/0188894 A1* | 7/2009 | Baughman | B23K 26/34 219/69.15 |
| 2014/0124483 A1* | 5/2014 | Henn | B23K 26/342 219/76.1 |
| 2015/0041025 A1 | 2/2015 | Wescott et al. | |
| 2016/0288260 A1 | 10/2016 | Kobayashi et al. | |
| 2016/0346875 A1* | 12/2016 | Bruck | H01S 3/0608 |
| 2018/0050421 A1 | 2/2018 | Marchione et al. | |
| 2018/0085842 A1 | 3/2018 | Lattner et al. | |
| 2021/0008662 A1* | 1/2021 | Kubisch | B23K 26/1476 |

FOREIGN PATENT DOCUMENTS

| | | |
|---|---|---|
| CN | 107 457 484 A | 12/2017 |
| EP | 1 542 828 B1 | 12/2006 |
| JP | H04344881 A | 12/1992 |
| JP | 2011-050998 A | 3/2011 |
| JP | 2014-240090 A | 12/2014 |

OTHER PUBLICATIONS

Nowotny, et al.; "High-performance laser cladding with combined energy sources"; Journal of Laser Applications; vol. 27, No. S1; Dated Feb. 2015; pp. S17001-1-S17001-7.

OR Laser; "Hybrid Manufacturing"; https://www.or-laser.com/uploads/tx_ipdatasheet/Hybrid_manufacturing_EN_06.pdf; Accessed on Oct. 26, 2018; pp. 1-8.

Foster, et al.; "Laser-Assisted Wire Additive Manufacturing System for the Deep Space Gateway"; Deep Space Gateway Science Workshop; LPI Contrib. No. 2063; Dated Feb. 2018.

Yang, et al.; "Integration of sensors and inkjet-printed RFID tags on paper-based substrates for UHF "Cognitive Intelligence" applications"; IEEE Antennas and Propagation Society International Symposium; Dated Jun. 2007 pp. 1193-1196.

DMG Mori; "Lasertec 65 3D"; https://in.dmgmori.com/products/machines/additive-manufacturing/powder-nozzle/lasertec-65-3d; Accessed on Oct. 26, 2018; pp. 1-9.

* cited by examiner

LASER HOT WIRE ADDITIVE DEPOSITION HEAD WITH OMNI-DIRECTIONAL BUILD PATH

CROSS REFERENCE TO RELATED APPLICATION/INCORPORATION BY REFERENCE

This U.S. patent application claims priority to and the benefit of U.S. Provisional Patent Application Ser. No. 62/700,398, filed on Jul. 19, 2018, the disclosure of which is incorporated herein by reference in its entirety.

FIELD

Embodiments of the present invention relate to systems and methods related to additive manufacturing, often synonymously referred to as 3D printing, and more specifically to a laser hot wire additive deposition head allowing for an omni-directional build path.

BACKGROUND

Conventionally, additive manufacturing processes are able to make near net shape parts at relatively low deposition rates where each part is built up layer-by-layer. However, the orientation of deposition equipment may have to be constantly adjusted while depositing a layer of, for example, metal material. Such constant adjusting may involve complex path planning and robotic manipulation. Furthermore, the laser optics in some laser hot wire implementations can be quite complex, requiring the splitting and then recombining of the laser beam. Such complex optical implementations can be quite costly.

SUMMARY

Embodiments of the present invention include systems and methods related to a laser hot wire deposition head for additive manufacturing which allows for the production of omni-directional build paths. One embodiment includes a deposition head that includes a laser focusing device, a wire feeding device, and a filler wire contact tip or tube integrated into a single deposition head. The configuration of the deposition head provides a longitudinally oriented laser beam with the filler wire being fed at an angle of 30 degrees or less (e.g., 12 degrees in one embodiment) off the longitudinal axis of the laser beam. The longitudinal (lengthwise, linear) axis corresponds to a directional vector of the laser beam path in free space toward a surface of a substrate or part to be additively manufactured. Such a configuration allows for the deposition head to be moved in any translational direction or path (e.g., with respect to a Cartesian plane) without having to change an angle of the deposition head or rotate the deposition head normal to the path plane. The laser beam that is created and conveyed to the processing site follows a single path within the deposition head. For example, the laser beam is not split into multiple paths and then brought back together. With regard to the available software typically used for layer slicing and path planning of an additive manufactured part, the processing complexity is significantly increased when having to adjust the rotational orientation of the deposition equipment. Furthermore, if the rotational orientation of the deposition equipment must be accounted for, then the winding and unwinding of the equipment and supporting umbilical of process hoses and utilities must also be taken into account as well, in some cases making an additive manufactured part with moderately complex geometry significantly more difficult, expensive, time intensive, or ultimately impossible to produce. For these reasons and others not mentioned within the context of this document, deposition equipment with rotational orientation that is directionally dependent on the path may be less favorable for specific applications and less versatile for general usage.

In one embodiment, an integrated laser hotwire additive deposition head includes a structural frame, a laser process sub-system, a wire feeding device, and a contact tube. The laser process sub-system includes a laser focusing device that is mounted within the frame and is configured to emit a single beam path laser beam in a longitudinally-oriented direction toward a surface of a substrate or a part to be additively manufactured. The single beam path laser beam is not split or recombined within the integrated laser hotwire additive deposition head. The wire feeding device and contact tube are mounted within the frame and are configured to feed a consumable filler wire toward the substrate or part at an angle of between 1° and 30° with respect to the longitudinally-oriented direction. The angle is manually adjustable between 1° and 30° via a contact tube assembly that is outfitted with an angular pivot joint. Specifically, the contact tube is integrated into a spherical ball and socket swivel joint and is coupled to a flexible wire conduit, which subsequently attaches to the rigid mounted wire feeder, thereby enabling the angular adjustment and repositioning of the wire as it enters the path of the laser beam. The deposition head is configured to be moved omni-directionally with respect to the substrate or the part, under the guidance of a motion control system, to additively manufacture the part without having to angularly change an orientation of the single beam path laser beam from the longitudinally-oriented direction (the established direction for additively manufacturing a current portion of the part) or rotate the deposition head. In one embodiment, a distance between a first position, where the laser beam converges with the substrate or the part, and a second position, where a tip of the consumable filler wire converges with the substrate or the part, is manually adjustable. Fine tuning the convergence of the wire as it enters into the path of the laser beam is accomplished via a 2-axis linear cross-slide module, which holds the hot wire contact block and contact tube assembly. In one embodiment, the integrated laser hotwire additive deposition head includes a nose cone, utility hoses and conduits, and a water-cooled hot wire contact block. In one embodiment, the wire feeding device includes a motor and drive rollers. In one embodiment, the consumable filler wire approaches the contact tube within the deposition head at a first angle of about 30 degrees or less from the longitudinally-oriented direction, and then exits the contact tube at a second angle of about 1 to 5 degrees from the longitudinally-oriented direction (e.g., due to the contact tube being curved). In one embodiment, the laser device operates in the infrared spectrum providing an output power of up to 15 kilowatts. In one embodiment, deposition rates of up to about 10.0 kilograms per hour are achievable. In one embodiment, the laser focusing device includes at least one of a laser light focusing optics module, a focusing optics assist gas inlet, an unperforated focusing optics cover slide, and a focusing optics outlet tip.

In one embodiment, an integrated laser hotwire additive deposition head includes a frame, a laser process sub-system, and a contact tube. The laser process sub-system includes a laser focusing device that is mounted within the frame and is configured to deliver a single beam path laser beam in a longitudinally-oriented direction toward a surface of a substrate or a part to be additively manufactured. The single beam path laser beam is not split or recombined within the integrated laser hotwire additive deposition head. The contact tube is mounted within the frame and is configured to accept a consumable filler wire from an external wire feeding device and guide the consumable filler wire toward the substrate or the part at an angle of between 1° and 30° with respect to the longitudinally-oriented direction. In one embodiment, the angle is manually adjustable between 1° and 30° (e.g., via a wire-entry adjustment unit). The deposition head is configured to be moved omni-directionally with respect to the substrate or the part, under the guidance of a motion control system, to additively manufacture the part without having to angularly change an orientation of the single beam path laser beam from the longitudinally-oriented direction (the established direction for additively manufacturing a current portion of the part) or rotate the deposition head. In one embodiment, a distance between a first position, where the laser beam converges with the substrate or the part, and a second position, where a tip of the consumable filler wire converges with the substrate or the part, is manually adjustable. In one embodiment, the integrated laser hotwire additive deposition head includes a nose cone, utility hoses and conduits, and a water-cooled contact block. In one embodiment, the consumable filler wire approaches the contact tube within the deposition head at a first angle of about 30 degrees or less from the longitudinally-oriented direction, and then exits the contact tube at a second angle of about 1 to 5 degrees from the longitudinally-oriented direction (e.g., due to the contact tube being curved). In one embodiment, the laser device operates in the infrared spectrum providing an output power of up to 15 kilowatts. In one embodiment, deposition rates of up to about 10.0 kilograms per hour are achievable. In one embodiment, the laser focusing device includes at least one of a laser light focusing optics module, a focusing optics assist gas inlet, an unperforated focusing optics cover slide, and a focusing optics outlet tip. In one embodiment, the integrated laser hotwire additive deposition head includes at least one of a thermally/electrically insulating plate, a wire-entry adjustment unit, a nose cone locking collar, and a supplementary/tip cooling gas conduit. The insulating plate, constructed of fiber reinforced, high thermal capacity polymer material serves a primary purpose of preventing electrical conduction back through the structural frame of the additive deposition head and through the robot, controller, or allied system wiring. Such uncontrolled and unanticipated transmission of electrical current typically damages the equipment and also is likely to have a deleterious effect on the deposition head process performance. As a secondary feature, the thermally insulating properties prevent thermal transfer beyond the water cooled processing head contact block and into the structural frame of the head or other areas that are devoid of a method for actively controlling the temperature. The wire entry adjustment unit allows for fine tuning of the infeed angle of the deposition process, where specific applications may show slight deposition performance benefits at slightly different infeed angles due to differences in physical and thermal properties of the various alloys employed by the process. The nose cone locking collar is a threaded collar which secures the process nose cone in place against the water cooled contact block, in accordance with one embodiment. It also permits the nose cone to be removed and repaired or replaced if it becomes damaged and, furthermore, allows nose cones of varying shape or design to be installed for a given additive manufacturing application. The supplemental tip cooling gas conduit supplies inert shielding gas inside the nose cone, directing a stream of gas onto the tip of the wire contact tube to aid in cooling the tip and subsequently flooding the deposition site and surrounding part build region.

Numerous aspects of the general inventive concepts will become readily apparent from the following detailed description of exemplary embodiments and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

The examples and figures herein are illustrative only and are not meant to limit the subject invention, which is measured by the scope and spirit of the claims. As is generally known, additive manufacturing is a process in which a material is deposited onto a base/substrate or part (e.g., in layers) so as to create a desired manufactured product. Patterns of multiple layers of a three-dimensional (3D) part to be additively manufactured are represented and stored as digital data, in accordance with one embodiment. The digital data may be from a CAD model or from a scanned part, for example.

Embodiments of additive manufacturing equipment may include, for example, at least one of a laser-based subsystem, a plasma based subsystem, an electrical arc based subsystem, an electron beam based subsystem, or an electric resistance based subsystem to, for example, deposit a metal material by melting a metal wire. Furthermore, some embodiments of additive manufacturing equipment may include, for example, a wire delivery or feeding system to feed/deliver a consumable metal wire to additively manufacture a 3D part on a base. Also, some embodiments of additive manufacturing equipment may include, for example, kinematic control elements (e.g., robotics) or other types of control elements (e.g., optical control elements) to move a laser beam, a plasma beam, an electric arc, an electron beam, or a consumable metal wire with respect to a 3D part being additively manufactured on a base or substrate.

Figure 1:
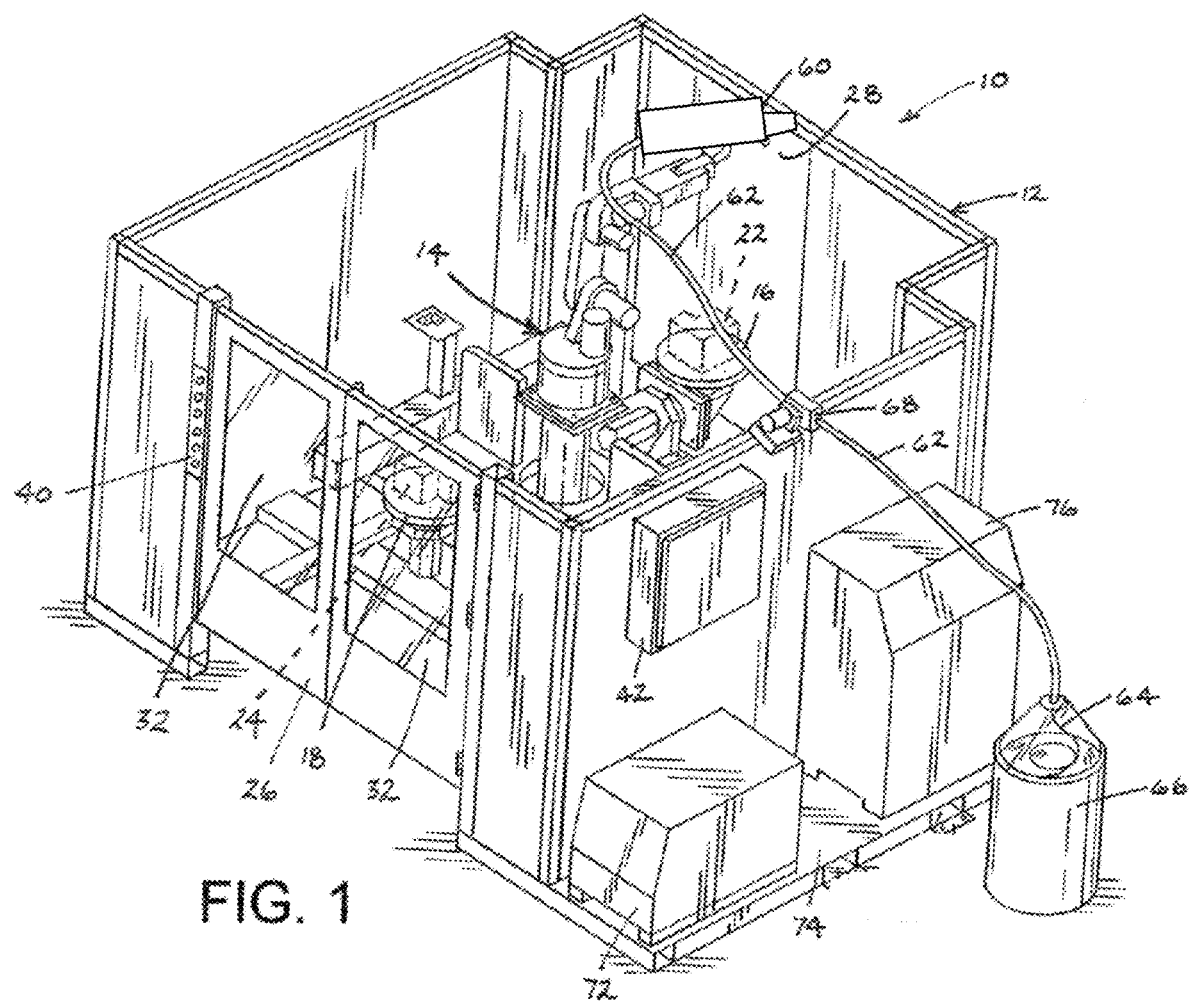
FIG. 1 illustrates one embodiment an additive manufacturing cell for additively manufacturing a part with an integrated deposition head.
Figure 2:
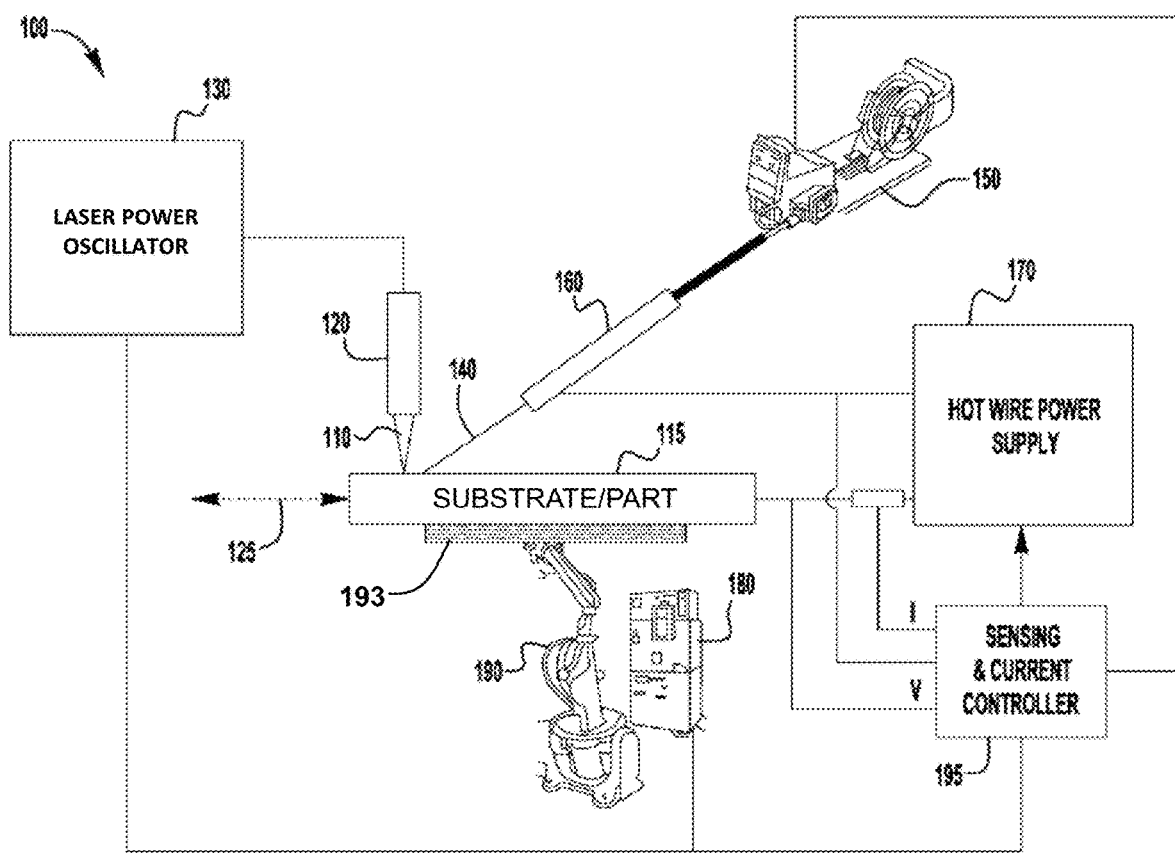
FIG. 2 illustrates a conventional laser hot wire (LHW) system using a laser and a filler wire in an additive manufacturing process.

FIG. 1 and FIG. 2 are included herein to put embodiments of an integrated deposition head in context. With reference to FIG. 1, FIG. 1 illustrates one embodiment of an additive manufacturing cell 10 configured with laser hot wire equipment for manufacturing a metal part via additive manufacturing. The laser hot wire equipment of FIG. 1 includes an integrated deposition head attached to an arm of a robot. The additive manufacturing cell 10 generally includes a frame 12, a robot 14 disposed within the frame, and first and second tables 16 and 18, respectively, also disposed within the frame. The additive manufacturing cell 10 is useful for additively manufacturing parts (e.g., 22 and 24) in a manner that will be described in more detail below herein. In the depicted embodiment of FIG. 1, the frame 12 includes a plurality of side walls and doors to enclose the robot 14 and the tables 16 and 18. Even though a substantially rectangular configuration in plan view is shown, the frame 12, and the cell 10, can take numerous configurations.

A front access door 26 mounts to the frame 12 to provide access to the interior of the frame. The front access door 26 can take a bi-fold configuration where the door includes two hinge sets: a first hinge set attaching the door 26 to the frame 12 and a second hinge set attaching one panel of the door to another panel. Nevertheless, the front access door 26 can take other configurations such as a sliding door or a swinging door. Similarly, a rear access door 28 also mounts to the frame 12. The rear access door 28 in the depicted embodiment also takes a bi-fold configuration; however, the rear access door can take other configurations such as those discussed with reference to the front access door 26. Windows 32 can be provided on either door (only depicted on front door 26). The windows can include a tinted safety screen, which is known in the art (e.g., a laser wavelength appropriate filtering screen . . . e.g., for 1064 nm). In accordance with one embodiment, the cell 10 is a CDRH Class 1 laser enclosure.

A control panel 40 is provided on the frame 12 adjacent the front door 26. Control knobs and/or switches provided on the control panel 40 communicate with controls housed in a controls enclosure 42 that is also mounted to the frame 12. The controls on the control panel 40 can be used to control operations performed in the additive manufacturing cell 10 in a similar manner to controls used with known additive manufacturing cells.

In one embodiment, the robot 14 mounts on a pedestal that mounts on a support. The robot 14 in the depicted embodiment is centered with respect to the tables 16 and 18 and includes multiple axes of movement. If desired, the pedestal can rotate with respect to the support, similar to a turret. Accordingly, some sort of drive mechanism, e.g. a motor and transmission (not shown), can be housed in the pedestal and/or the support for rotating the robot 14.

In one embodiment, a deposition head 60 attaches to a distal end of an arm of the robot 14. The deposition head 60 is an integrated laser hot wire deposition head, in accordance with embodiments discussed later herein, for example. The deposition head 60 allows for omni-directional build paths (deposition motion) without having to change the rotational orientation of the deposition head 60 (i.e., the rotational orientation of the deposition head can be held constant during deposition of a layer). A flexible tube or conduit 62 attaches to the deposition head 60. A consumable metal wire 64 (used as a hot wire), which can be stored in a container 66, is delivered to the deposition head 60 through the conduit 62. In one embodiment, a wire feeder 68 attaches to the frame 12 (or the robot 14) to facilitate the delivery of the consumable metal wire 64 to the deposition head 60. In another embodiment, the wire feeder 68 is integrated into the deposition head 60 (e.g., as an on-board integrated wire feed module) as discussed later herein.

Even though the robot 14 is shown mounted to a base or lower portion of the frame 12, if desired, the robot 14 can mount to an upper structure of the frame and depend downwardly into the cell 10. In one embodiment, a power supply 72 for a laser hot wire operation mounts to and rests on a platform 74 that is connected to and can be a part of the frame 12. The power supply 72 may serve as both a laser power oscillator (to generate laser energy) and a welding power source to energize the consumable metal wire 64 as it passes through the deposition head 60. In another embodiment, the power supply 72 may be implemented as two separate power supplies, one for acting as a laser power oscillator for generating laser energy and another for heating the consumable metal wire 64 as it passes through the deposition head 60. A cell controller 76 communicates with and controls various portions of the laser hot wire equipment of the additive manufacturing cell 10 (including the robot 14) and rests and mounts on the platform 74. In accordance with yet another embodiment, the laser power oscillator may be integrated into the deposition head 60 (e.g., for lower power applications).

FIG. 2 illustrates a conventional laser hot wire (LHW) system 100 using a laser subsystem and a filler wire in an additive manufacturing process. The system 100 may exist in an additive manufacturing cell similar to the additive manufacturing cell 10 of FIG. 1. However, the system 100 of FIG. 2 does not include an integrated laser hot wire deposition head. The system 100 of FIG. 2 includes a filler wire feeder and an energy source. In particular, the system 100 includes a laser subsystem capable of focusing a laser beam 110 onto a substrate or part 115 to heat the substrate or part 115. The laser subsystem may be a high intensity energy source. The laser subsystem can be any type of high energy laser source, including but not limited to carbon dioxide, Nd:YAG, Yb-disk, YB-fiber, fiber delivered, or direct diode laser systems (e.g., fiber-coupled direct diode).

The laser subsystem includes a laser focusing device 120 and a laser power supply 130 (laser power oscillator) operatively connected to each other. The laser power supply 130 provides power to generate the laser energy that is provided (e.g., fiber-optically) to the laser focusing device 120. The system 100 also includes a hot filler wire feeder subsystem capable of providing at least one resistive filler wire 140 to make contact with the substrate or part 115 in the vicinity of the laser beam 110. The wire feeder subsystem includes a filler wire feeder 150, a contact tube 160, and a power supply 170. During operation, the filler wire 140 is resistance-heated by electrical current from the power supply 170 which is operatively connected between the contact tube 160 and the substrate or part 115. The power supply 170 may be a pulsed direct current (DC) power supply, although alternating current (AC) or other types of power supplies are possible as well. The wire 140 is fed from the filler wire feeder 150 through the contact tube 160 toward the substrate or part 115 and extends beyond the tube 160. The extension portion of the wire 140 is resistance-heated such that the extension portion approaches or reaches the melting point before contacting the substrate or part 115. In accordance with one embodiment, the hot wire power supply 170 provides hot wire waveform control (active augmentation of current, voltage, and shape parameters) to sustain a hot wire process and suppress arcing. The laser beam 110 may serve to melt some of the base metal of the substrate or part 115 to form a puddle and/or can also be used to melt the wire 140 onto the substrate or part 115. The power supply 170 provides energy needed to resistance-melt the filler wire 140.

The system 100 further includes a motion control subsystem capable of moving the laser beam 110 and the resistive filler wire 140 in a same controlled direction 125 along the substrate or part 115 (at least in a relative sense) such that the laser beam 110 and the resistive filler wire 140 remain in a fixed relation to each other. The relative motion between the substrate or part 115 and the laser/wire combination may be achieved by actually moving the substrate or part 115 or by moving the laser device 120 and the wire feeder subsystem.

In FIG. 2, the motion control subsystem includes a motion controller 180 operatively connected to a robot 190 having a platform 193 (e.g., a rotatable platform and/or a translatable platform). The motion controller 180 controls the motion of the robot 190. The robot 190 is operatively connected (e.g., mechanically secured) to the substrate or part 115 via the platform 193 to move the substrate or part 115 in, for example, a present direction of travel 125 such that the laser beam 110 and the wire 140 effectively travel along the substrate or part 115. The robot 190 driving the platform 193 may be driven electrically, pneumatically, or hydraulically.

The system 100 further includes a sensing and current control subsystem 195 which is operatively connected to the substrate or part 115 and the contact tube 160 (i.e., effectively connected to the output of the power supply 170) and is capable of measuring a potential difference (i.e., a voltage V) between and a current (I) through the substrate or part 115 and the wire 140. The sensing and current control subsystem 195 may further be capable of calculating a resistance value (R=V/I) and/or a power value (P=V*I) from the measured voltage and current. In general, when the wire 140 is in contact with the substrate or part 115, the potential difference between the wire 140 and the substrate or part 115 is zero volts or very nearly zero volts (a relatively low voltage). As a result, the sensing and current control subsystem 195 is capable of sensing when the resistive filler wire 140 is in contact with the substrate or part 115 and is operatively connected to the power supply 170 to be further capable of controlling the flow of current through the resistive filler wire 140 in response to the sensing (e.g., for arc suppression). In one embodiment, the sensing and current controller 195 may be an integral part of the power supply 170.

In accordance with one embodiment of the present invention, the system 100 of FIG. 2 may be modified by providing a single integrated laser hot wire deposition head (e.g., as in FIG. 1) providing omni-directional build path capability. In one embodiment, at least a laser focusing device, a wire feeding device, and a contact tube are integrated into a single deposition head (forming an integrated deposition head). The integrated deposition head provides a steep infeed angle of a filler wire with respect to a longitudinal direction (toward a substrate or a part to be additively manufactured) of a laser beam delivered by the laser focusing device, as discussed in detail later herein, allowing for build path omni-directionality. The longitudinal direction is the linear direction along which the centerline of the laser beam is directed toward a surface of a substrate or part to be additively manufactured.

A system in which the integrated deposition head is used may be the system 10 of FIG. 1 or may include certain components of the system 100 of FIG. 2, including a laser power supply 130, a hot wire power supply 170, a motion controller 180, and a robot 190. However, the integrated deposition head is attached to the arm of a robot (e.g., as in FIG. 1), allowing the deposition head to be moved omni-directionally (e.g., along a Cartesian (e.g., x-y) plane) under the control of a motion controller with respect to the substrate/part without having to angularly change the longitudinal orientation or the rotational orientation of the deposition head. For example, in accordance with one embodiment, the integrated deposition head can remain in a same longitudinally-oriented position (e.g., a vertically-oriented position), without being rotated, during deposition of a layer. The longitudinally-oriented position allows the integrated deposition head to be easily moved by a robot during deposition of a layer of a part being additively manufactured without requiring a complex motion control scheme provided by the motion controller. Furthermore, having an integrated deposition head means that a separate laser subsystem and a separate hot wire subsystem do not have to be separately moved and synchronized with each other.

Figure 3:
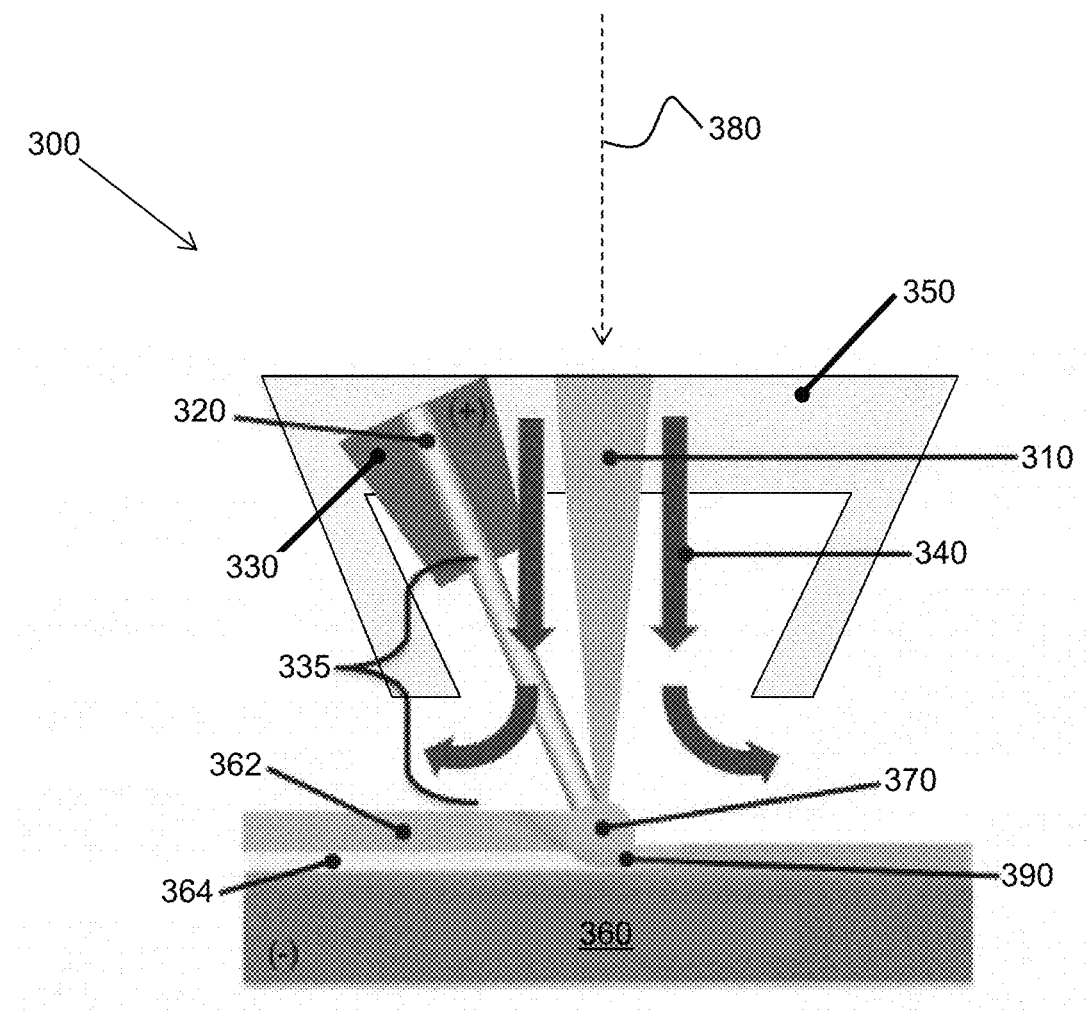
FIG. 3 illustrates a relationship between a laser beam, a consumable metal filler wire, a contact tip/tube, a shielding gas, and a nose cone of one embodiment of an integrated deposition head when depositing molten metal onto a substrate/layer during an additive manufacturing process.

FIG. 3 illustrates a relationship between a laser beam 310, a consumable metal filler wire 320, a contact tip/tube 330, a shielding gas 340, and a nose cone 350 of one embodiment of an integrated deposition head 300 when depositing molten metal onto a substrate/layer 360 during an additive manufacturing process. The laser beam 310 is vertically oriented and focused at a convergence site 370 where the tip of the filler wire 320 meets the laser beam 310. In accordance with one embodiment, the laser beam 310 may be produced by a fiber-delivered laser. However, the laser subsystem can be any type of high energy laser source, including but not limited to carbon dioxide, Nd:YAG, Yb-disk, YB-fiber, fiber delivered, or direct diode laser systems (e.g., fiber-coupled direct diode).

The filler wire 320 is oriented at an angle of 30 degrees or less off the longitudinal (e.g., vertical) direction 380 of the laser beam 310. The consumable metal filler wire 320 is preheated via the contact tip/tube 330 and is fed into contact with the substrate/layer 360. A hot wire power supply (external to the deposition head 300) provides the electrical power to preheat the filler wire 320. In accordance with one embodiment, the hot wire power supply provides hot wire waveform control (active augmentation of current, voltage, and shape parameters) to sustain a hot wire process and suppress arcing. A laser power supply (a laser power oscillator external to the laser focusing device) generates and provides the laser energy (e.g., fiber-optically) to a laser focusing device which produces the laser beam 310. The laser beam 310 melts the substrate/a preceding additive build layer(s) 360, and/or the preheated filler wire 320 to fuse molten metal 390 to the substrate/preceding additive build layer(s) 360. FIG. 3 shows a deposited zone 362 and a dilution zone 364 with respect to the substrate/layer(s) 360. FIG. 3 also shows a pre-heat zone 335 of the consumable metal filler wire 320. The laser beam 310 is a single path laser beam 310 which is not split or recombined in any manner within the integrated deposition head 300, in accordance with one embodiment.

A coaxial gas shielding configuration coming down the center of the deposition head through the optics protects the process and the deposited metal, and helps to keep debris from moving toward the laser device and the optics. A sacrificial focusing optics cover slide (which is not perforated) also helps to protect the laser device and the optics. There is no perforation of the cover slide because the consumable filler wire does not need to pass through the cover slide. The steep infeed angle of the filler wire of 15 degrees or less provides omni-directionality of additive build paths. That is, additive build-up can be achieved without changing an angle of the longitudinal orientation or rotational orientation of the integrated deposition head. In general, the wire tip to laser spot spatial relationship tends to change as the deposition head is moved around. This movement can be minimized by having the steep filler wire infeed angle. Furthermore, in accordance with one embodiment, the pathway of the consumable filler wire coming up to and into the integrated deposition head is relatively straight.

Figure 4:
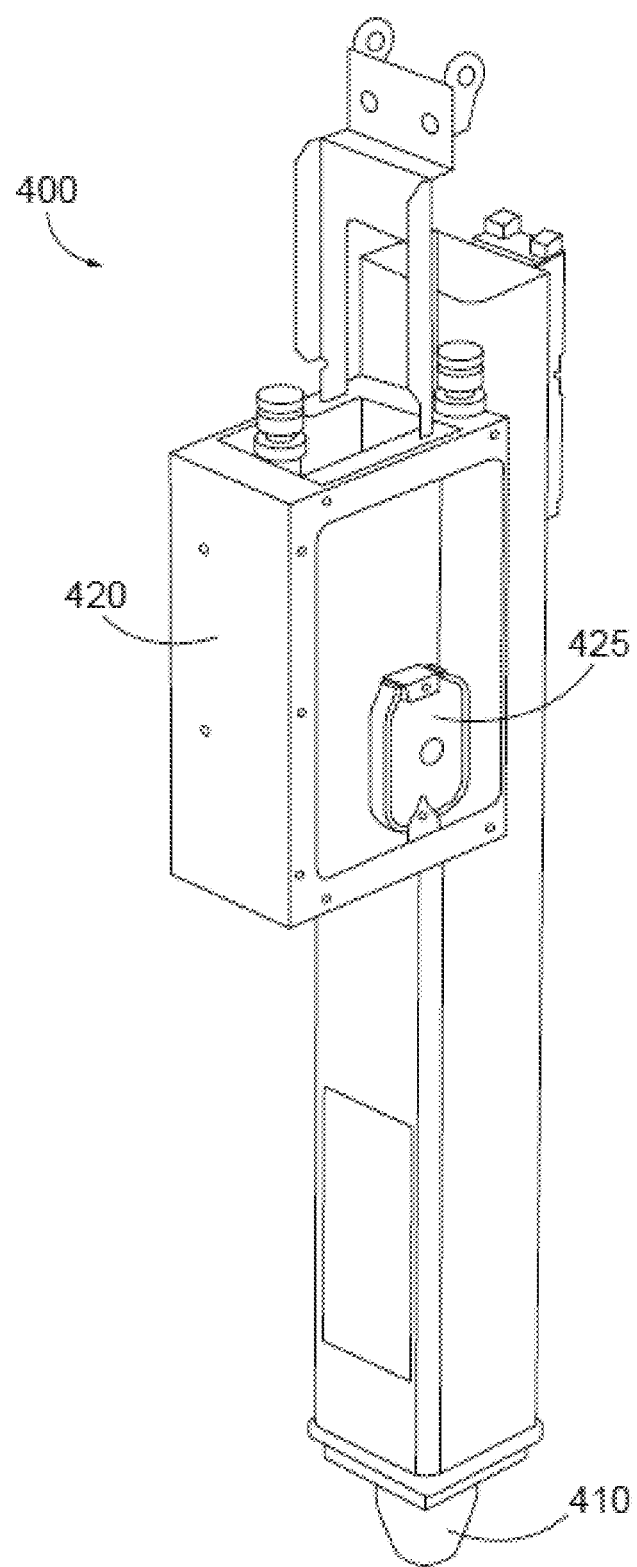
FIG. 4 illustrates one embodiment of a vertically oriented integrated deposition head showing a nose cone and a wire feeding device.
Figure 5:
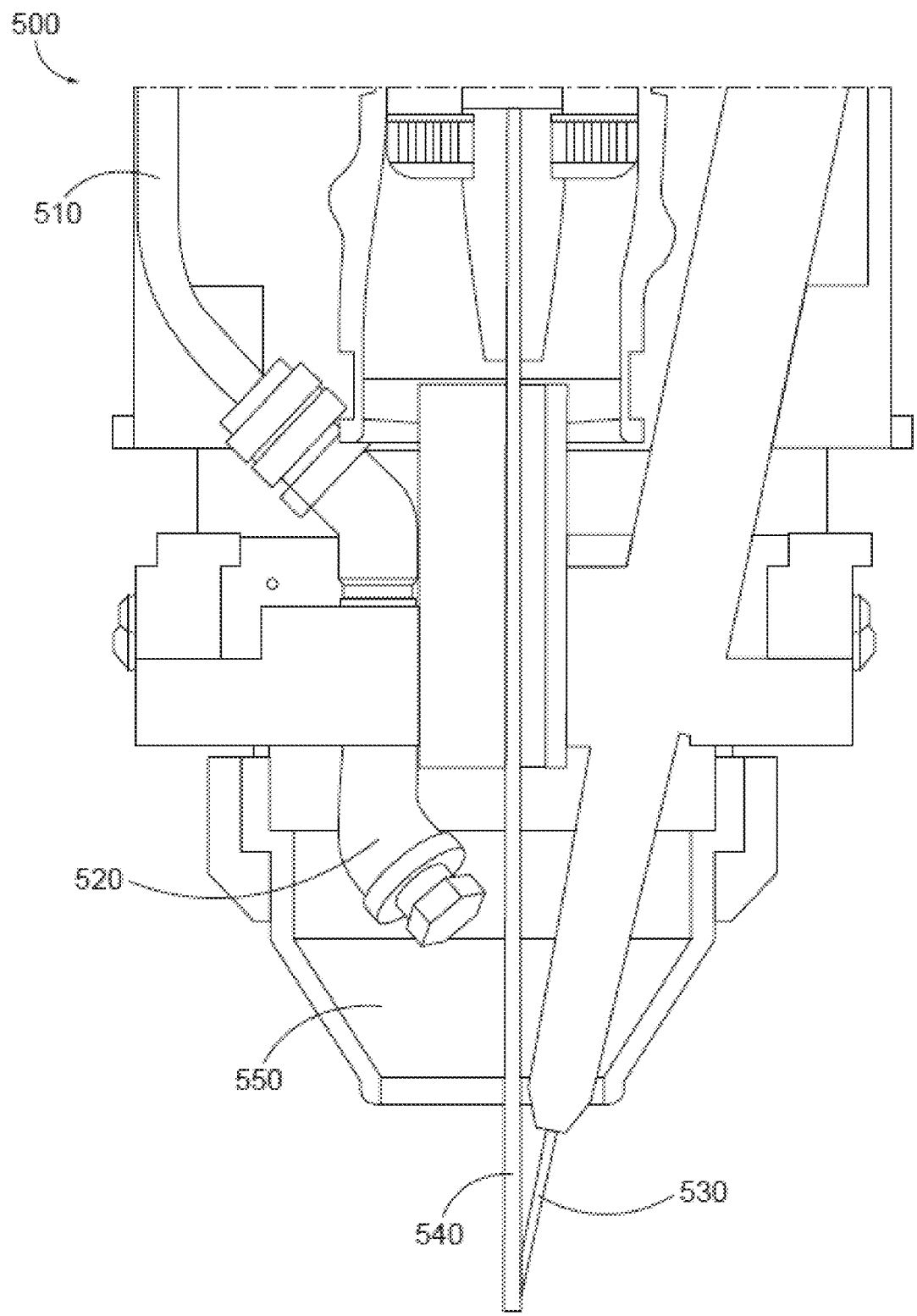
FIG. 5 illustrates one embodiment of an internal configuration of a portion of an integrated deposition head that also provides a supplemental cooling/shielding gas via a gas hose and gas nozzle.

FIG. 4 illustrates one embodiment of a vertically oriented integrated deposition head 400 showing the nose cone 410, and the wire feeding device 420 (an on-board integrated wire feed module) having drive rollers 425. The wire feeding device 420 includes a servo-control drive (servo motor) to drive the drive rollers 425, providing stable and precise feeding of the consumable filler wire. The consumable filler wire comes into the integrated deposition head via a conduit. FIG. 5 illustrates one embodiment of an internal configuration of a portion of an integrated deposition head 500 that also provides a supplemental cooling/shielding gas via a gas hose 510 and gas nozzle 520. FIG. 5 also shows a nose cone 550. In one embodiment, the x-y position of the consumable filler wire 530 can be manually adjusted with respect to the laser beam 540 (i.e., can adjust how close the tip of the filler wire gets to the center of the laser beam spot at the substrate/layer or convergence site). Fine tuning the convergence of the wire as it enters into the path of the laser beam is accomplished via a 2-axis linear, dovetail cross-slide module, which holds the hot wire contact block and contact tube assembly. The cross-slide employs three plates that interconnect together via a linear dovetail shape and move relative to one another; a base plate, an intermediate carriage plate, and an upper mounting plate. These plates permit X-Y Cartesian planar linear motion (along 2 perpendicular axes) and are adjusted through the use of two threaded lead screws, one screw for each motion axis. The base plate attaches to the insulating plate and thereby to the structural frame of the additive deposition head. The water cooled contact plate attaches to the upper mounting plate of the slide, such that the contact plate and contact tip position may be adjusted relative to the structural frame, the laser focusing optics device that is rigidly affixed to the structural frame, and the laser beam path itself. In one embodiment, the steep angle between the laser beam 540 and the filler wire 530 is fixed. Furthermore, in accordance with another embodiment, the angle of the consumable filler wire 530 with respect to the vertical laser beam 540 can be manually adjusted (e.g., the angle may be continuously adjustable between 1 to 30 degrees). The angle is manually adjustable between 1° and 30° via a contact tube assembly that is outfitted with an angular pivot joint. Specifically, the contact tube is integrated into a spherical ball and socket swivel joint and is coupled to a flexible wire conduit, which subsequently attaches to the rigid mounted wire feeder, thereby enabling the angular adjustment and repositioning of the wire as it enters the path of the laser beam. A locking set screw is used to secure and hold the angular position in a fixed location for extended use. Loosening the setscrew allows the angular position of the contact tube to be changed by moving it using the hand and subsequently securing it in a new position by retightening this setscrew. In accordance with an alternative embodiment, the consumable filler wire 530 approaches the contact tube within the deposition head at an angle of 30 degrees or less (e.g., 12 degrees) with respect to the longitudinal direction of the laser beam, and then exits the contact tube almost longitudinally (e.g., at an angle of 1 to 5 degrees off the longitudinal direction) due to a curved contact tube.

Figure 6:
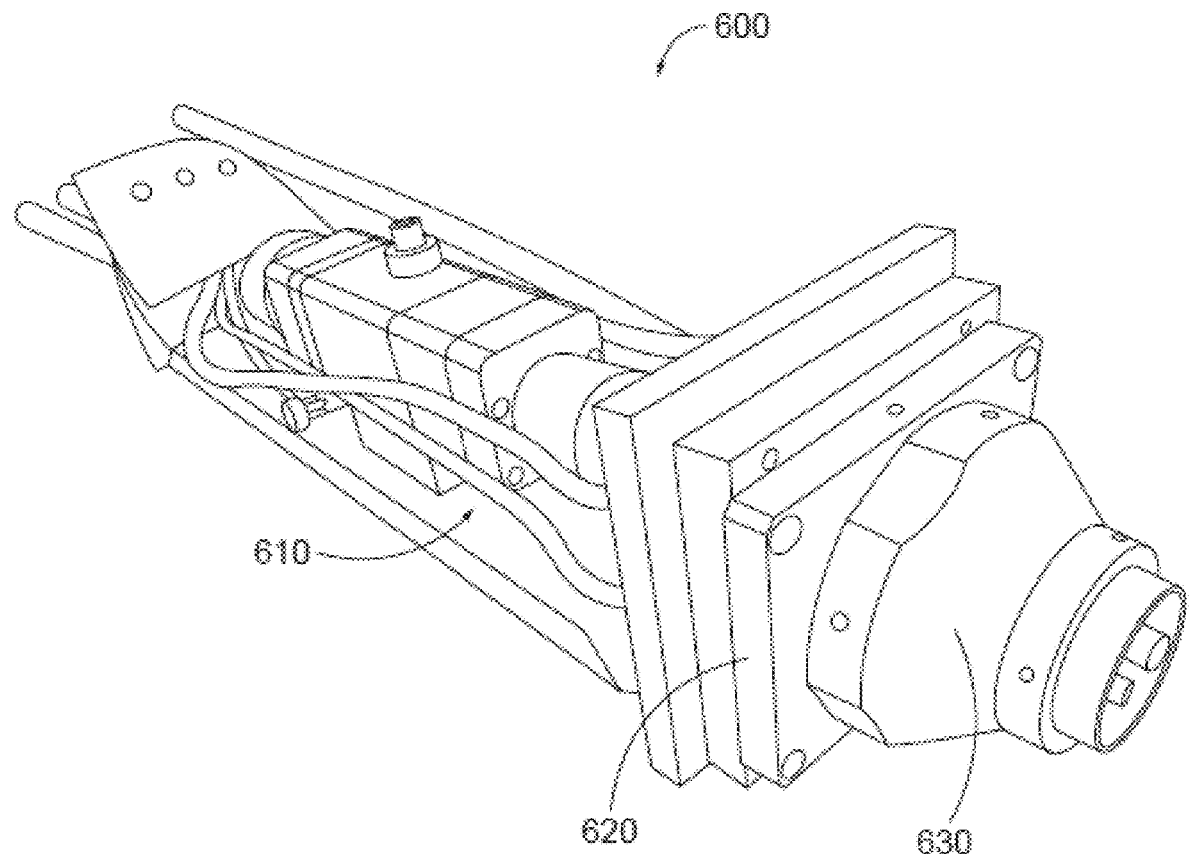
FIGS. 6-7 show two views of an embodiment of a partially assembled integrated deposition head showing utility hoses and conduits.
Figure 7:
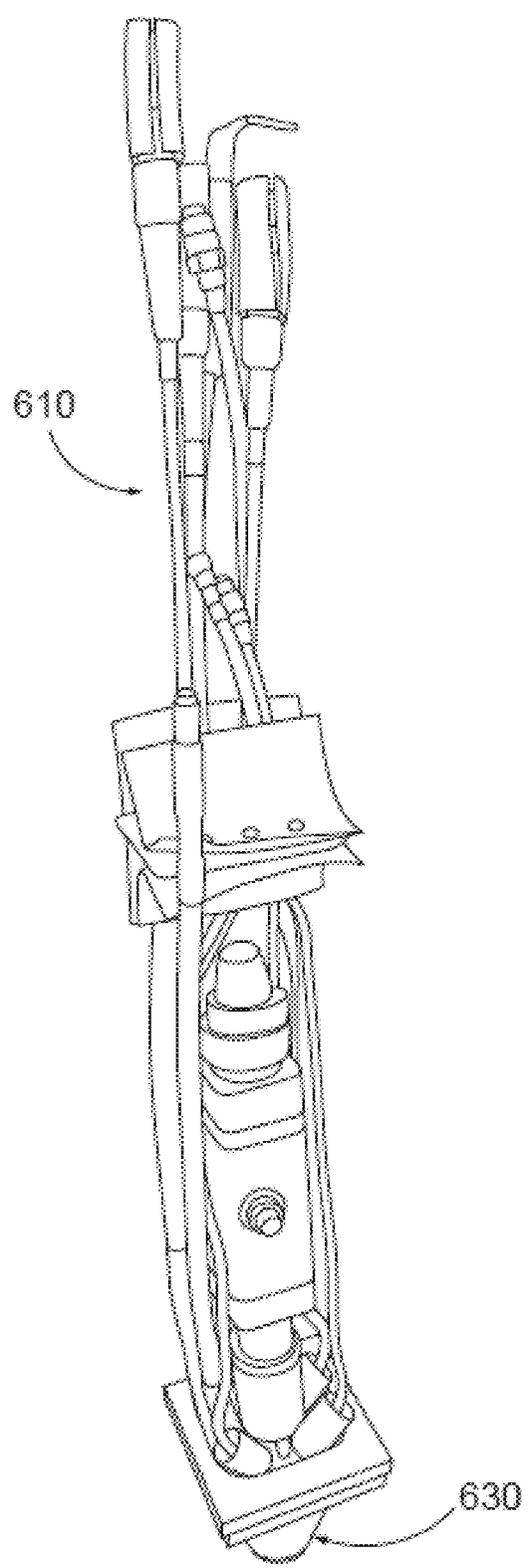
Figure 8:
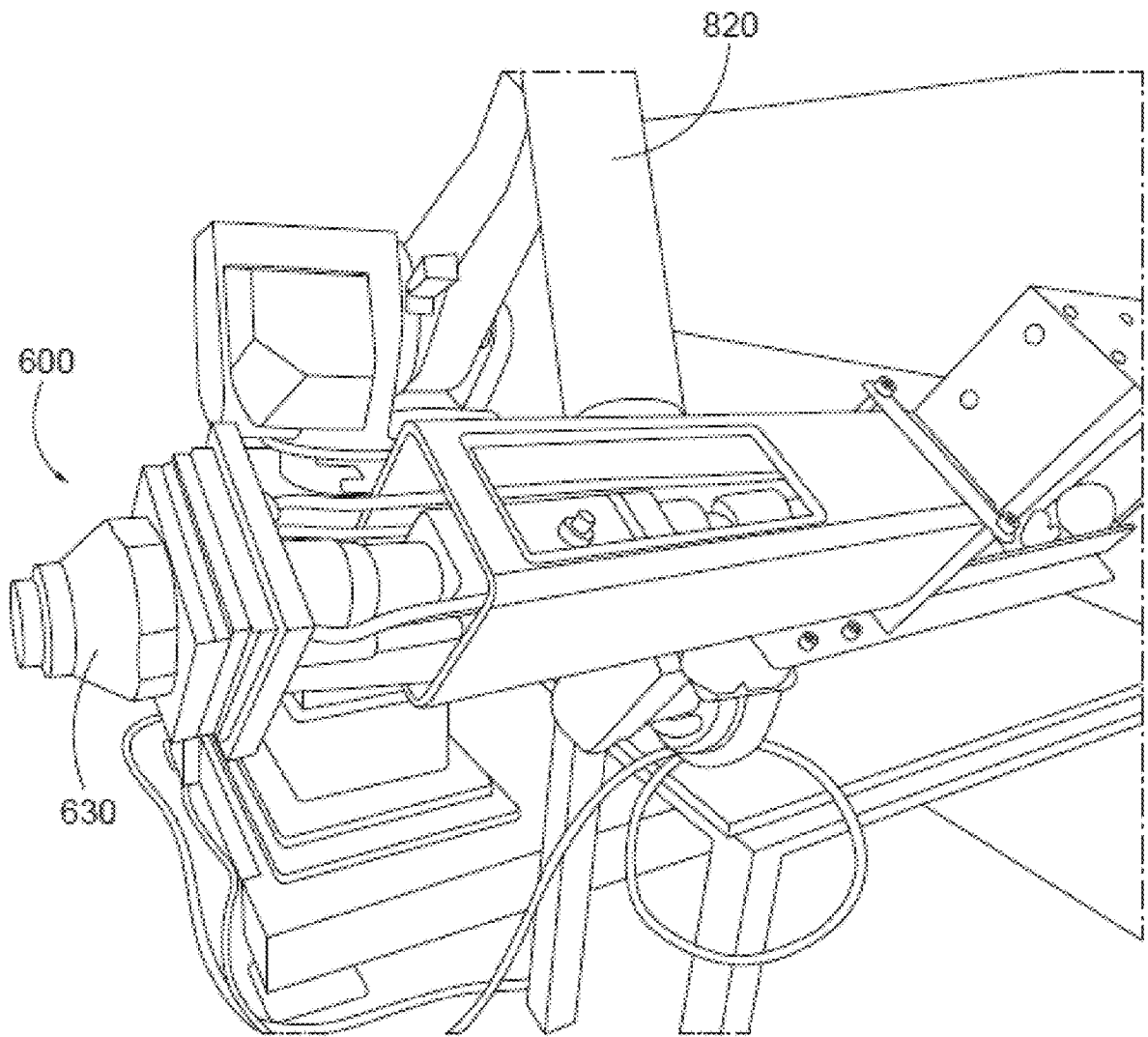
FIGS. 8-10 show three views of an embodiment of an integrated deposition head having covers removed and being attached to an arm of a robot.
Figure 9:
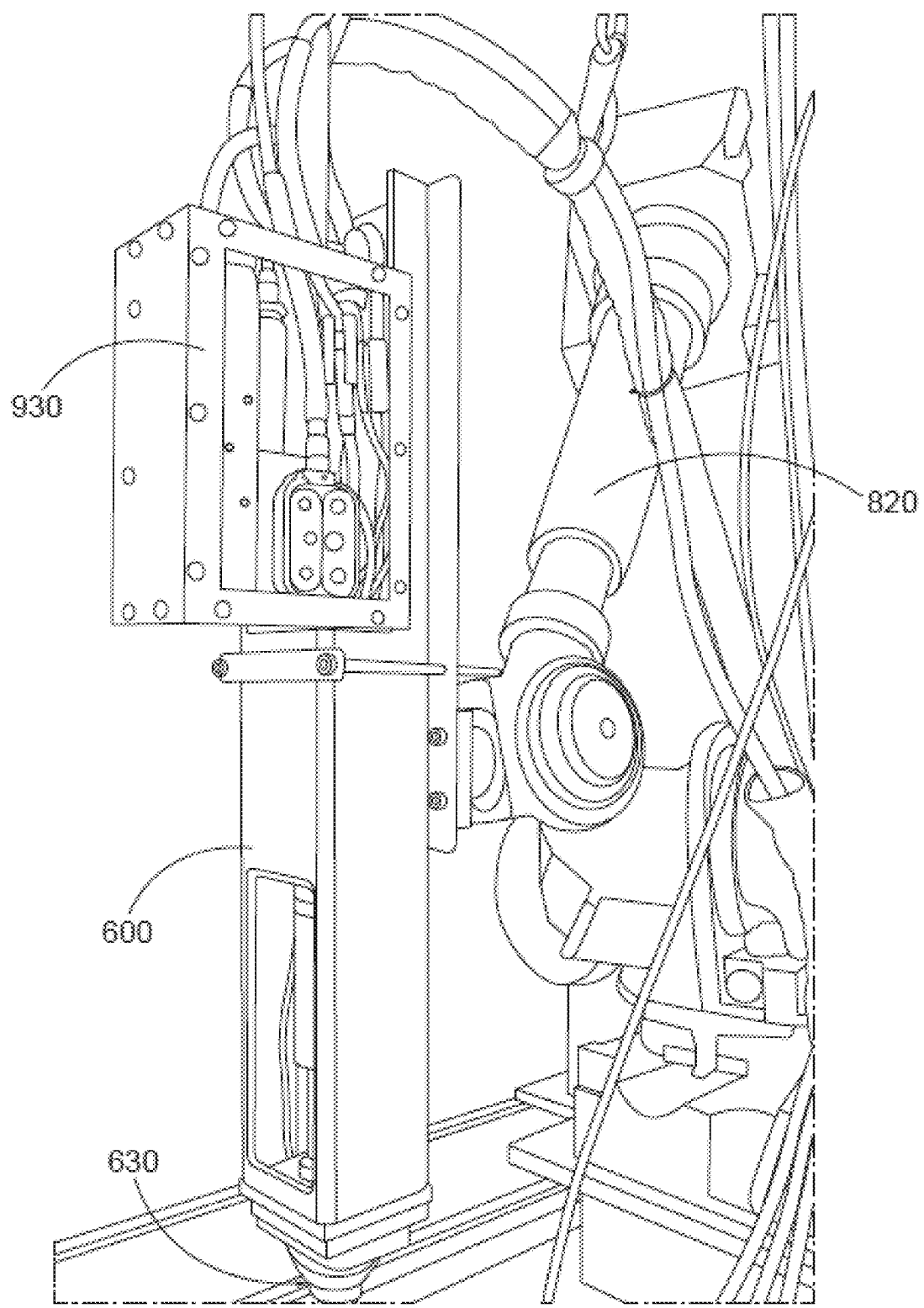
Figure 10:
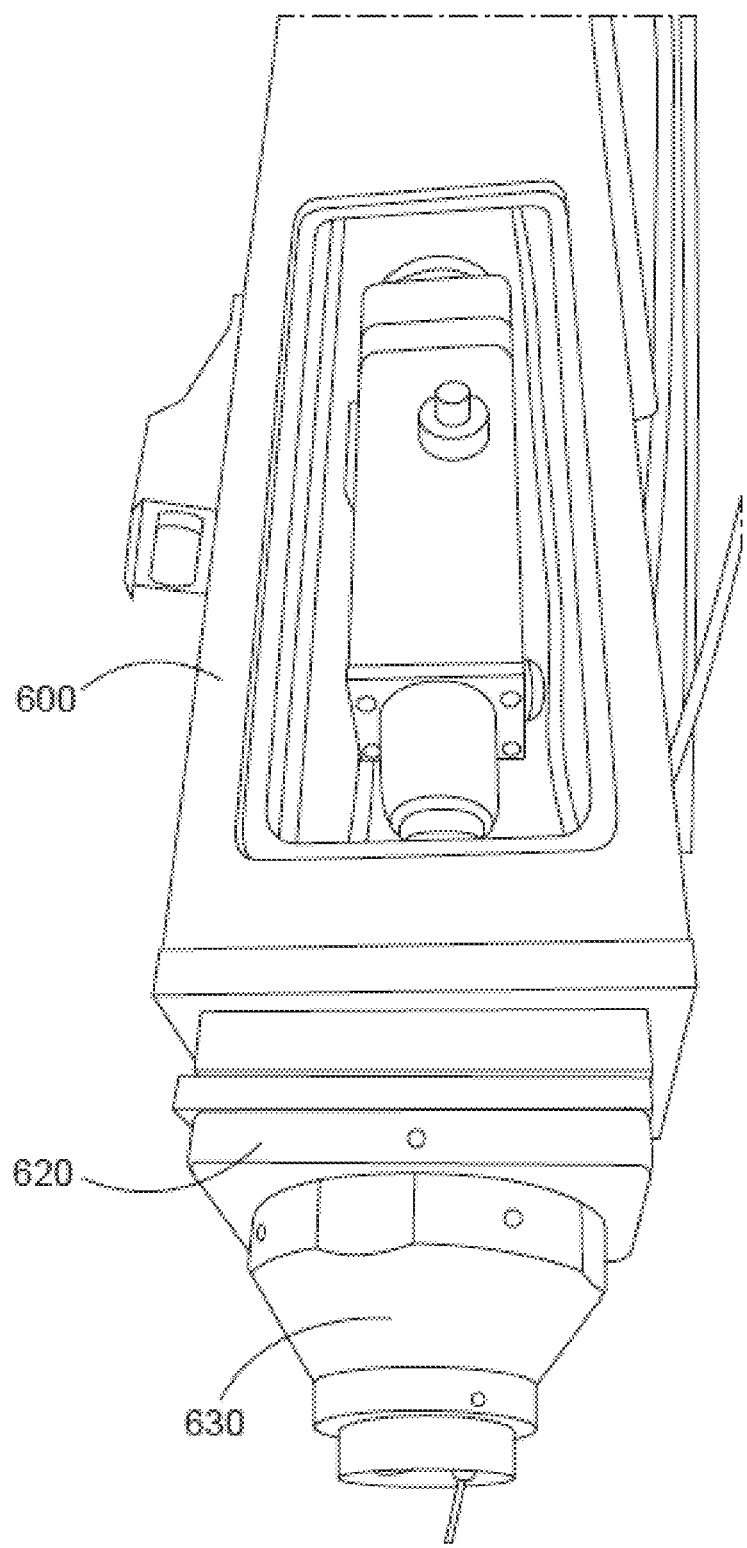
Figure 11:
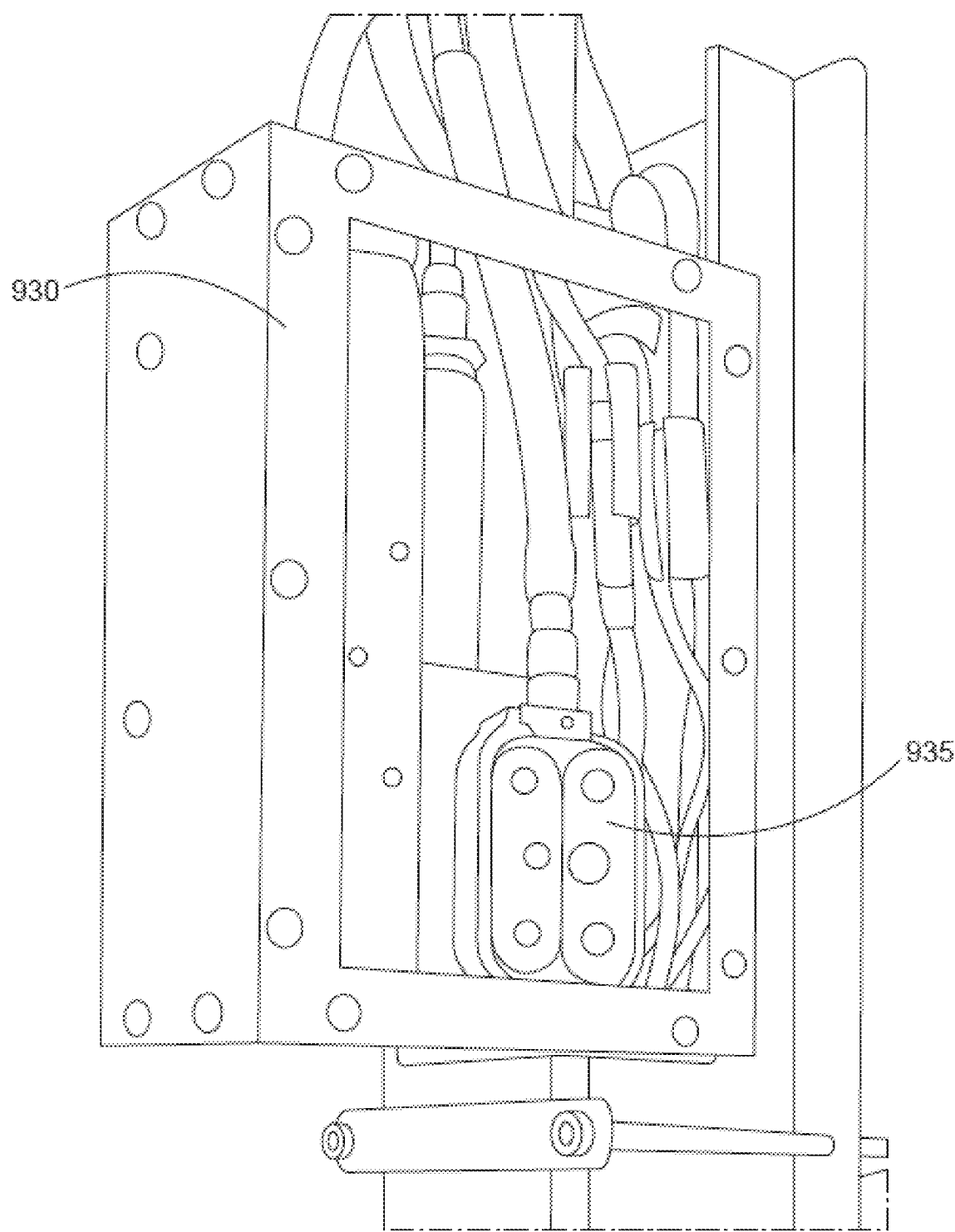
FIG. 11 shows one embodiment of a side of a wire feeding device (having a cover removed) which includes drive rollers.

FIGS. 6-7 show two views of an embodiment of an integrated deposition head 600 (partially assembled) showing utility hoses and conduits 610 (e.g., for wire, gas, water), a water-cooled contact block 620, and a nose cone 630. FIGS. 8-10 show three views of an embodiment of the integrated deposition head 600 having the nose cone 630, having covers removed, and being attached to an arm 820 of a robot. The deposition head 600 of FIG. 9 also shows a wire feeding device 930, and the deposition head 600 of FIG. 10 also clearly shows the water-cooled contact block 620. FIG. 11 shows one embodiment of a side of a wire feeding device 930 (having a cover removed) which includes drive rollers 935. The other side (not shown) of the wire feeding device 930 includes a motor for driving the drive rollers 935 and an integrated wire feeder circuit control board to control the motor (see FIG. 20).

Figure 12:
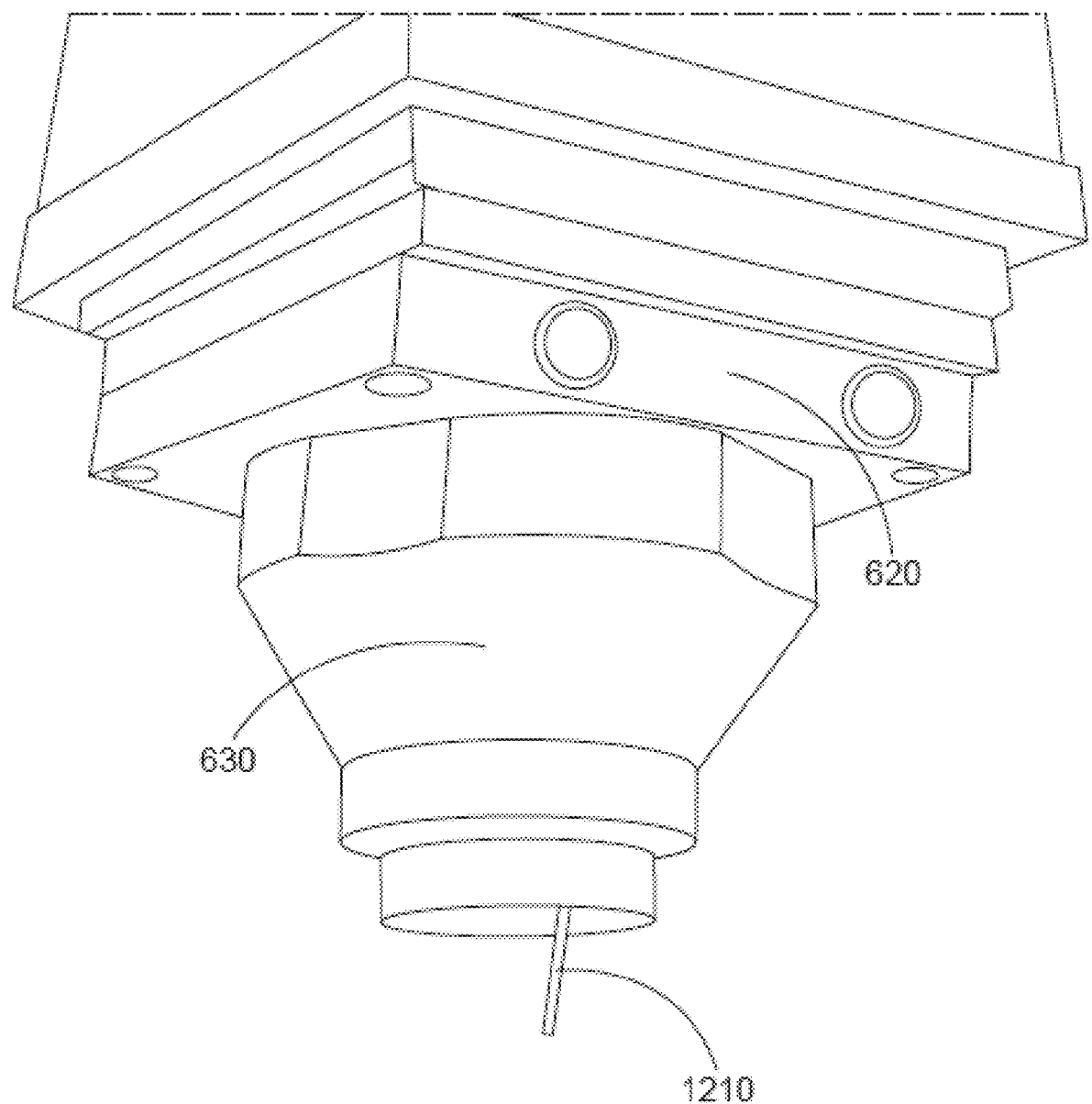
FIG. 12 shows an embodiment of a nose cone end of an integrated deposition head having a filler wire sticking out at a steep angle relative to vertical.
Figure 13:
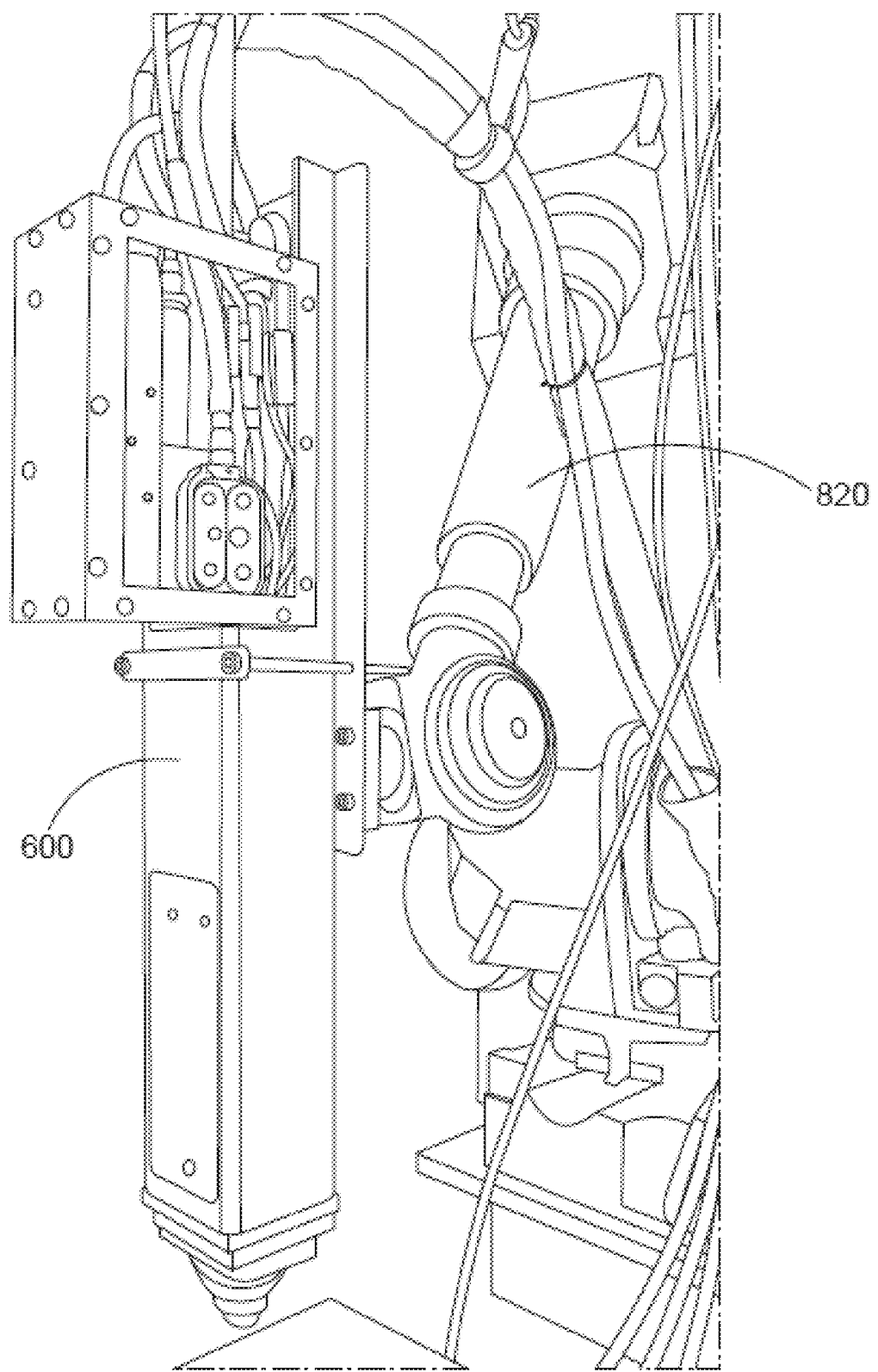
FIG. 13 shows one embodiment of an integrated deposition head attached to an arm of a robot.
Figure 14:
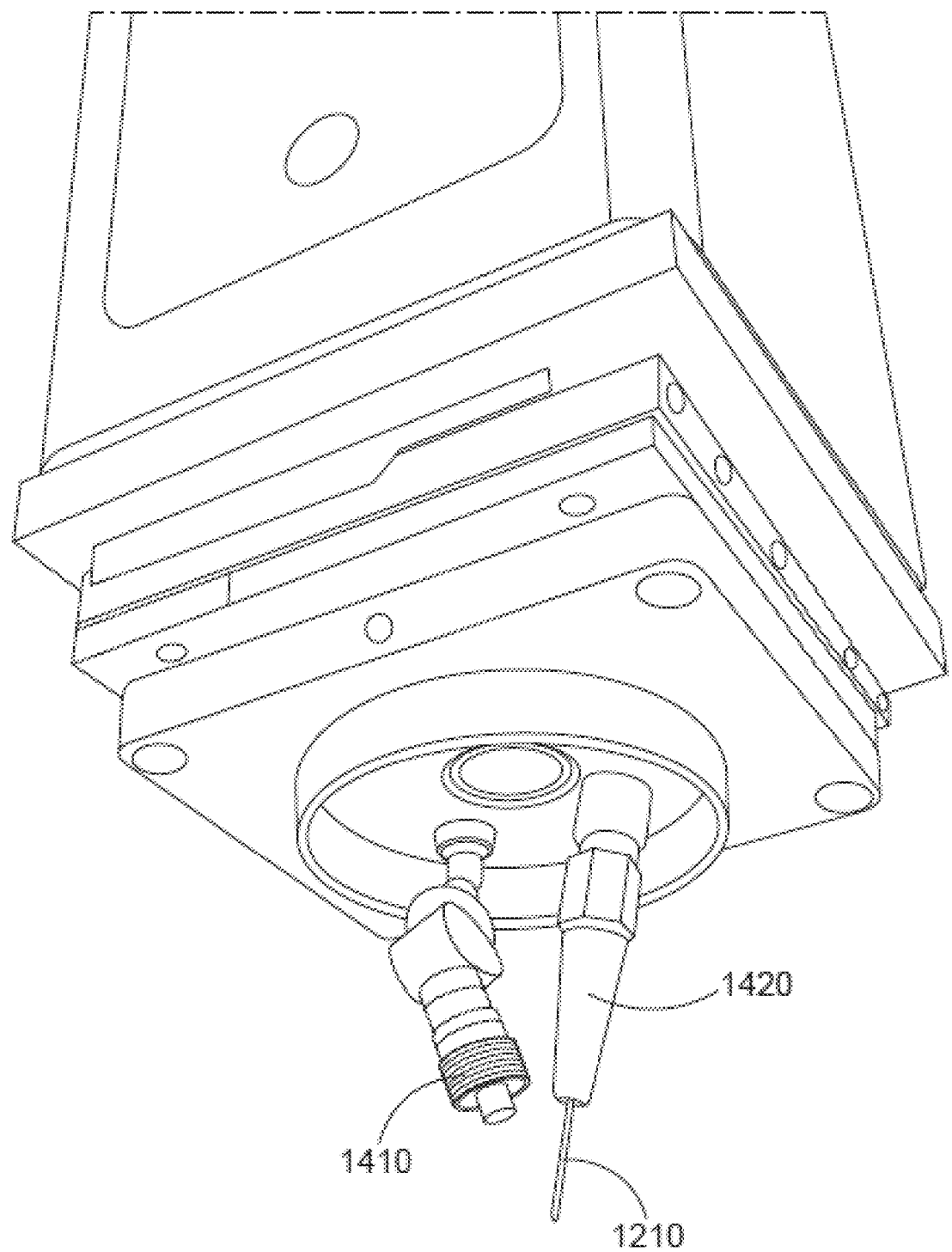
FIG. 14 shows a nose cone end of one embodiment of an integrated deposition head with a nose cone removed.
Figure 15:
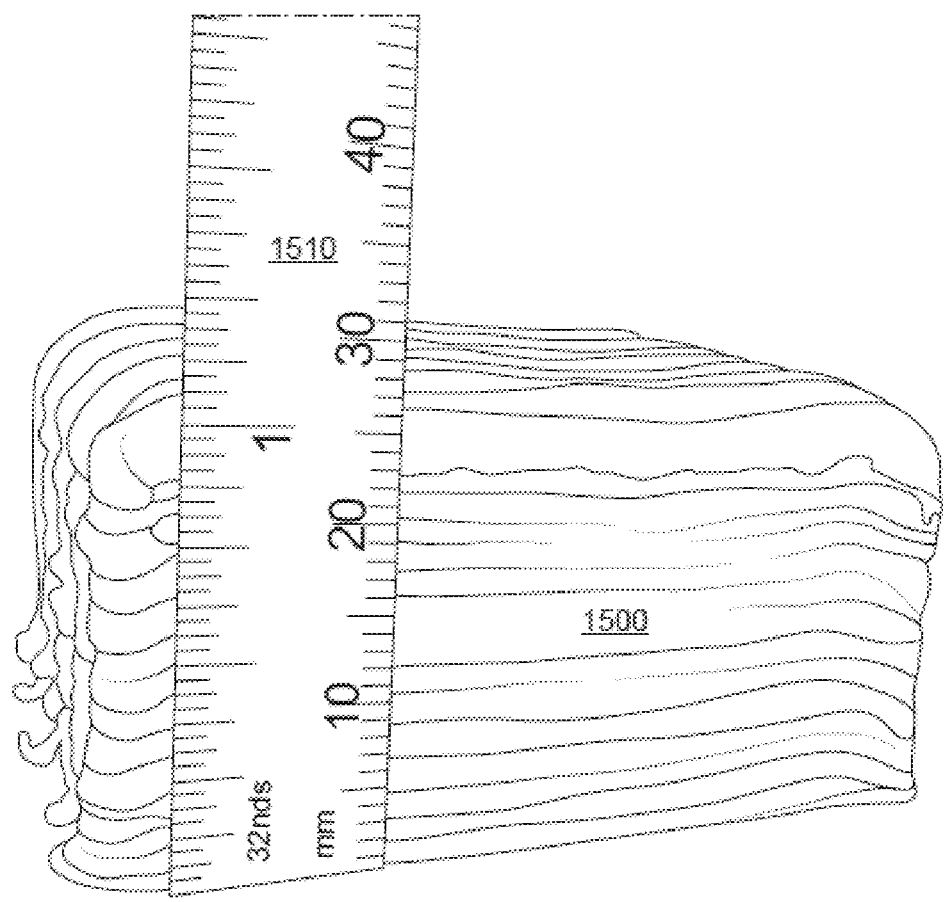
FIG. 15 shows a first example of multiple layers of metal deposited by one embodiment of an integrated deposition head during an additive manufacturing process to form a solid rectangular block.
Figure 16:
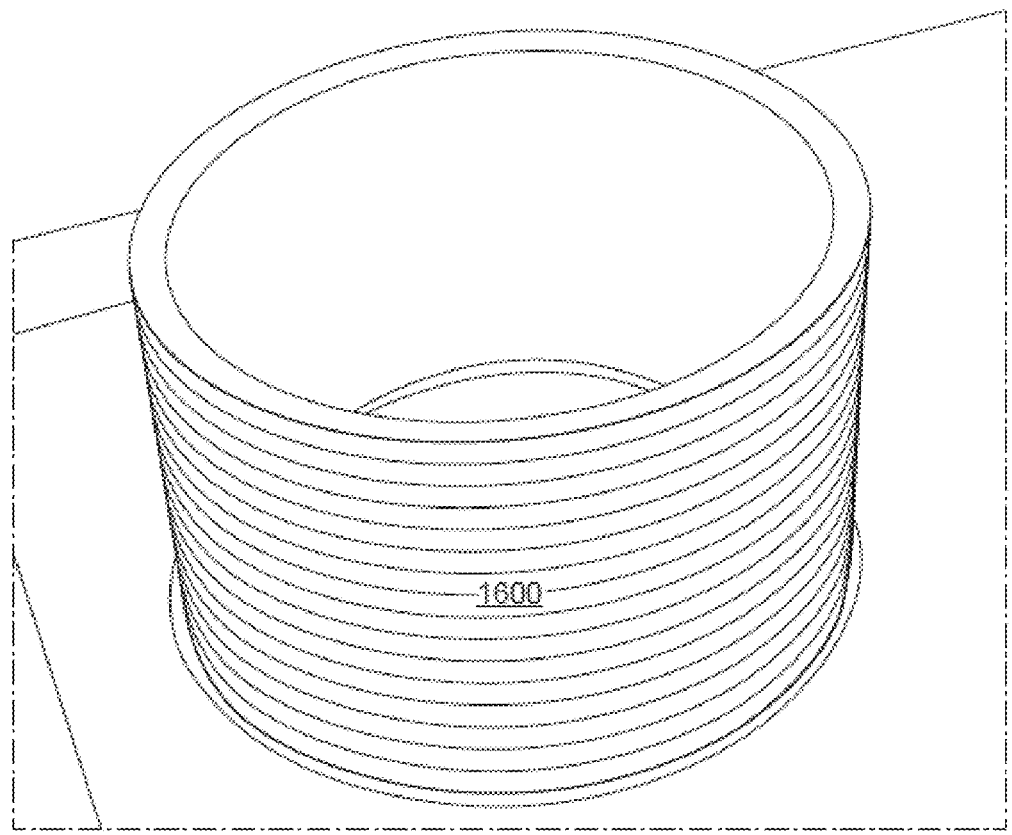
FIG. 16 shows a second example of multiple layers of metal deposited by one embodiment of an integrated deposition head during an additive manufacturing process to form a hollow cylindrical part.

FIG. 12 shows an embodiment of a nose cone end of the integrated deposition head 600 having a filler wire 1210 sticking out at a steep angle (less than 30 degrees) relative to longitudinal (e.g., vertical). The water-cooled contact block 620 keeps the nose cone 630 from getting too hot, which could damage the nose cone 630. The laser reflection can be intense and heat up the nose cone 630 if not cooled. Active or passive water (or some other fluid) cooling system may be used, in accordance with various embodiments. Tubing (a conduit 610) coming to the deposition head 600 provides water (or other fluid) to the water-cooled contact block 620, and other tubing (a conduit 610) carries the water away from the water-cooled contact block 620 and the deposition head 600. The water-cooled contact block 620 is clearly shown in some of the other figures as well (e.g., FIGS. 6, 10, 12, and 21). FIG. 13 shows one embodiment of the integrated deposition head 600 attached to the arm 820 of a robot. FIG. 14 shows a nose cone end of one embodiment of the integrated deposition head 600 with the nose cone 630 removed. A supplemental gas nozzle 1410 and a wire conduit 1420 (e.g., acting as a contact tube tip) having the filler wire 1210 extending out of the wire conduit (wire contact tube tip) 1420 can be seen. The supplemental gas nozzle supplies inert shielding gas inside the nose cone, directing a stream of gas onto the wire contact tube tip to aid in cooling the contact tube tip and subsequently flooding the deposition site and surrounding part build region. In contrast to the gas jet that is supplied into the focusing optics device against the cover slide which may increase in temperature as it contacts internal surfaces within the optics at elevated temperatures, the supplemental gas is delivered into the hot wire nose cone at or below ambient, room temperature as the gas, released from a pressurized storage tank, expands and undergoes a temperature decrease as a result. This stream of cooler gas flowing directly onto and around the contact tube tip will aid in transferring heat out of and away from the contact tube tip. Additionally, the gas then flows out of the nose cone and surrounds the deposition site providing additional protection for the actively depositing, molten or nearly molten metal which is more reactive with impurities when at elevated temperatures. This gas will most likely will be nitrogen or argon, or may be some other functionally inert gas dependent on the specific application and alloy composition of the metal deposit. FIG. 15 shows a first example of multiple layers of metal deposited by one embodiment of the integrated deposition head 600 during an additive manufacturing process to form a solid rectangular block 1500. A ruler 1510 having increments of millimeters (mm) is shown for dimensional comparison. FIG. 16 shows a second example of multiple layers of metal deposited by one embodiment of the integrated deposition head 600 during an additive manufacturing process to form a hollow cylindrical part 1600.

Figure 17:
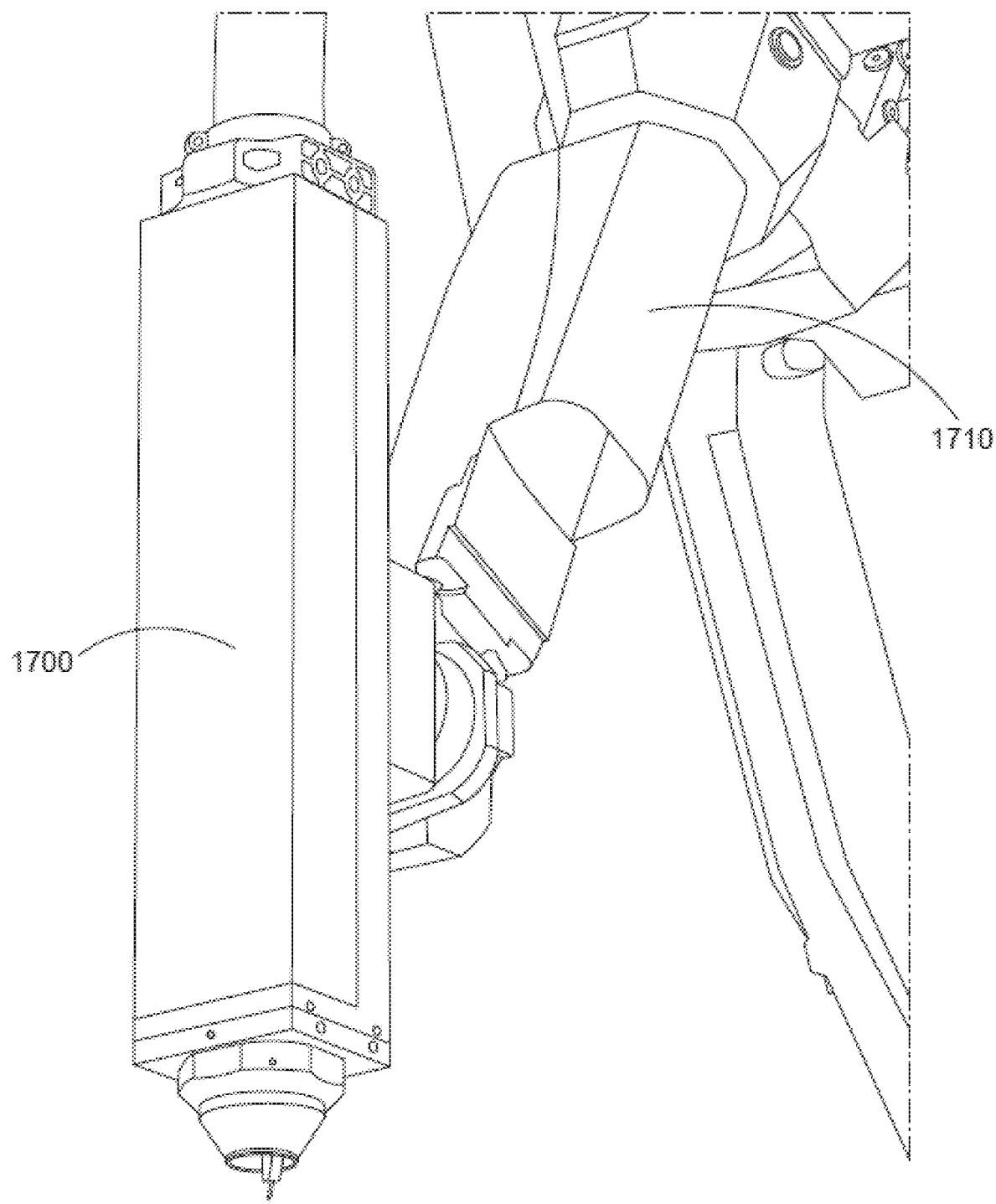
FIGS. 17-18 show an embodiment of a small and lightweight integrated deposition head attached to an arm of a robot.
Figure 18:
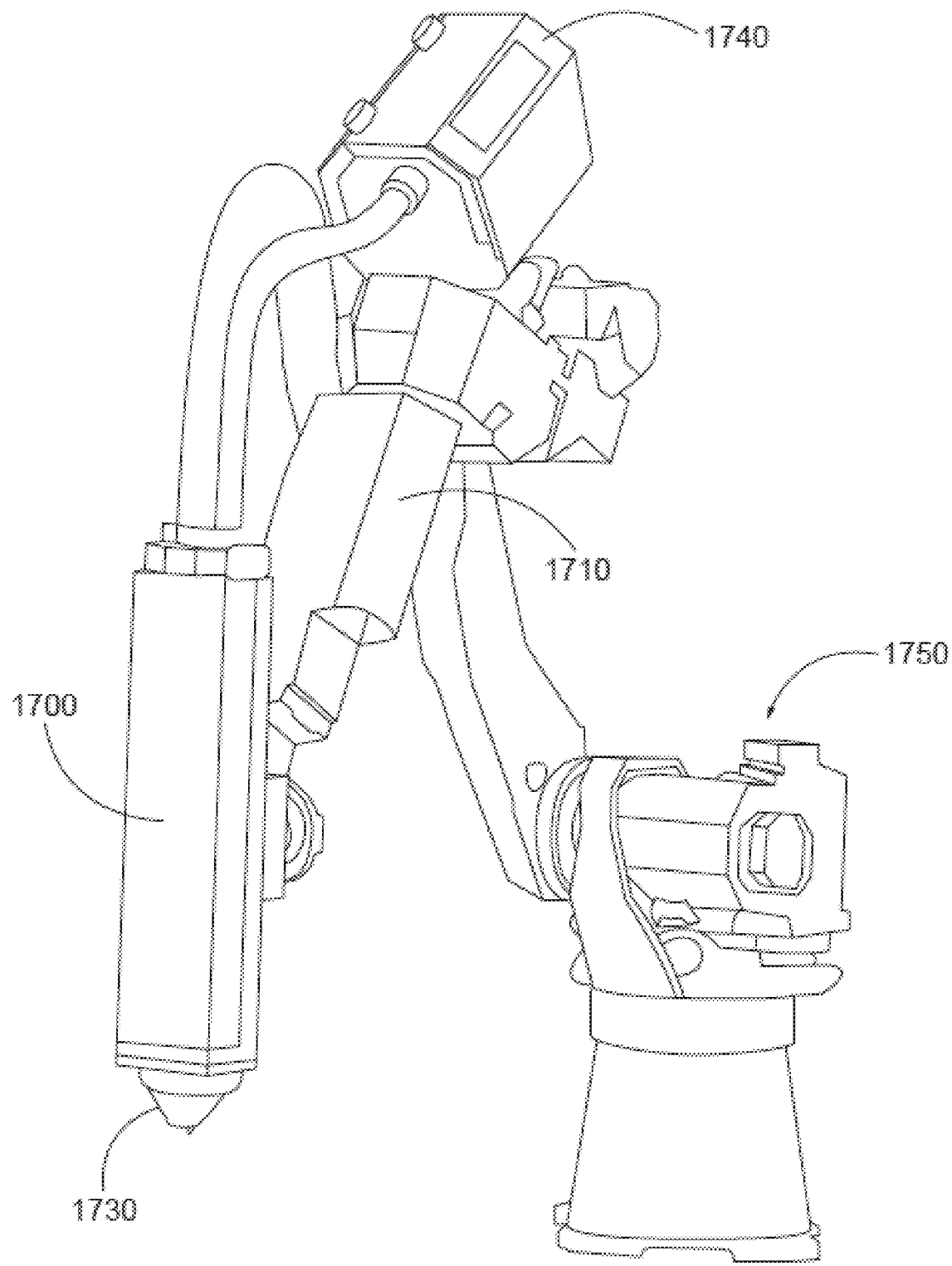

FIGS. 17-18 show an embodiment of an integrated deposition head 1700 attached to an arm 1710 of a robot. The integrated deposition head 1700 of FIGS. 17-18 is smaller in size and lighter in weight than the deposition head 600 shown, for example, in FIG. 13 and, therefore, can be attached to a relatively small robot 1750. In the embodiment of FIGS. 17-18, the wire feeding device 930 (servo-driven wire feeder) is no longer integrated into the deposition head 1700 but is, instead, external to the deposition head 1700 as wire feeding device 1740. This helps to reduce the size and weight of the deposition head 1700. In a similar embodiment, a push-pull feeder configuration may be used where the additive deposition head contains an integrated set of drive rolls and servo motor that is coupled with a robot mounted wire feeder containing additional drive rolls and a servo motor. In this embodiment, the deposition head includes an onboard, integrated, self-contained "pull" wire feeder module having drive rolls, a servo motor, and a feed control circuit board. A "push" wire feeder is independently mounted externally from the deposition head (e.g., robot mounted). Also, an aluminum base and a light weight cover also help to reduce the weight of the integrated deposition head 1700 of FIGS. 17-18. Furthermore, active cooling can be used to allow for a smaller and lighter nose cone 1730.

Figure 19:
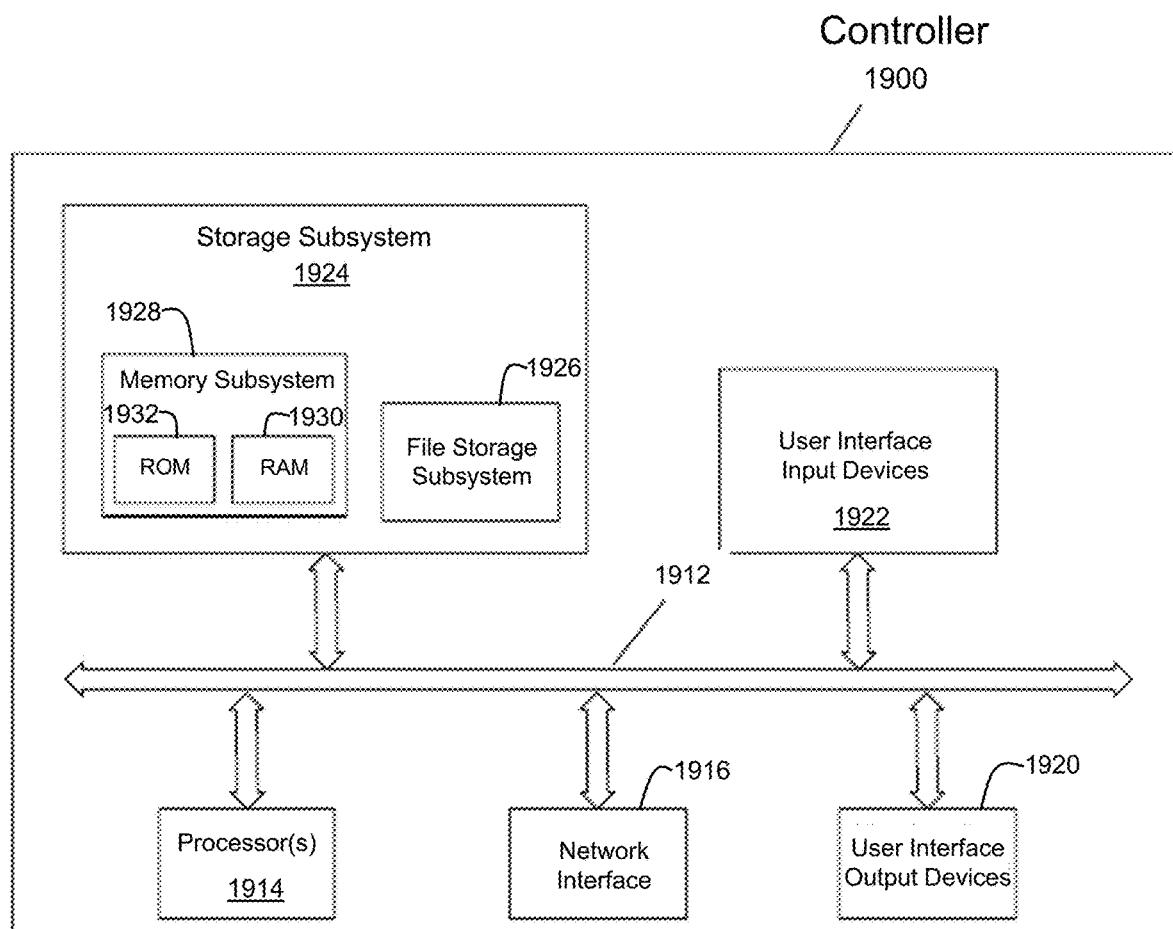
FIG. 19 illustrates one embodiment of an example controller used in an additive manufacturing system.

FIG. 19 illustrates one embodiment of an example controller 1900 used in an additive manufacturing system. The controller 1900 may be used as, for example, as a cell controller (e.g., the cell controller 76 of FIG. 1), as a motion controller (e.g., the motion controller 180 of FIG. 2), as a controller of a power supply (e.g., the power supply 72 of FIG. 1, the laser power supply 130 of FIG. 2, and/or the hot wire power supply 170 of FIG. 2), in accordance with various embodiments.

The controller 1900 includes at least one processor 1914 which communicates with a number of peripheral devices via bus subsystem 1912. These peripheral devices may include a storage subsystem 1924, including, for example, a memory subsystem 1928 and a file storage subsystem 1926, user interface input devices 1922, user interface output devices 1920, and a network interface subsystem 1916. The input and output devices allow user interaction with the controller 1900. Network interface subsystem 1916 provides an interface to outside networks and is coupled to corresponding interface devices in other computer systems. For example, the motion controller 180 of the system 100 may share one or more characteristics with the controller 1900 and may be, for example, a conventional computer, a digital signal processor, and/or other computing device.

User interface input devices 1922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 1900 or onto a communication network.

User interface output devices 1920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 1900 to the user or to another machine or computer system.

Storage subsystem 1924 stores programming and data constructs that provide or support some or all of the functionality described herein (e.g., as software modules). For example, the storage subsystem 1924 may include a CAD model of a part to be additively manufactured and the logic to identify deposit locations to adjust a location of an integrated metal deposition head during an additive manufacturing process.

Software modules are generally executed by processor 1914 alone or in combination with other processors. Memory 1928 used in the storage subsystem can include a number of memories including a main random access memory (RAM) 1930 for storage of instructions and data during program execution and a read only memory (ROM) 1932 in which fixed instructions are stored. A file storage subsystem 1926 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 1926 in the storage subsystem 1924, or in other machines accessible by the processor(s) 1914.

Bus subsystem 1912 provides a mechanism for letting the various components and subsystems of the controller 1900 communicate with each other as intended. Although bus subsystem 1912 is shown schematically as a single bus, alternative embodiments of the bus subsystem may use multiple buses.

The controller 1900 can be of varying types including a workstation, server, computing cluster, blade server, server farm, or any other data processing system or computing device. Due to the ever-changing nature of computing devices and networks, the description of the controller 1900 depicted in FIG. 19 is intended only as a specific example for purposes of illustrating some embodiments. Many other configurations of the controller 1900 are possible having more or fewer components than the controller depicted in FIG. 19.

Figure 20:
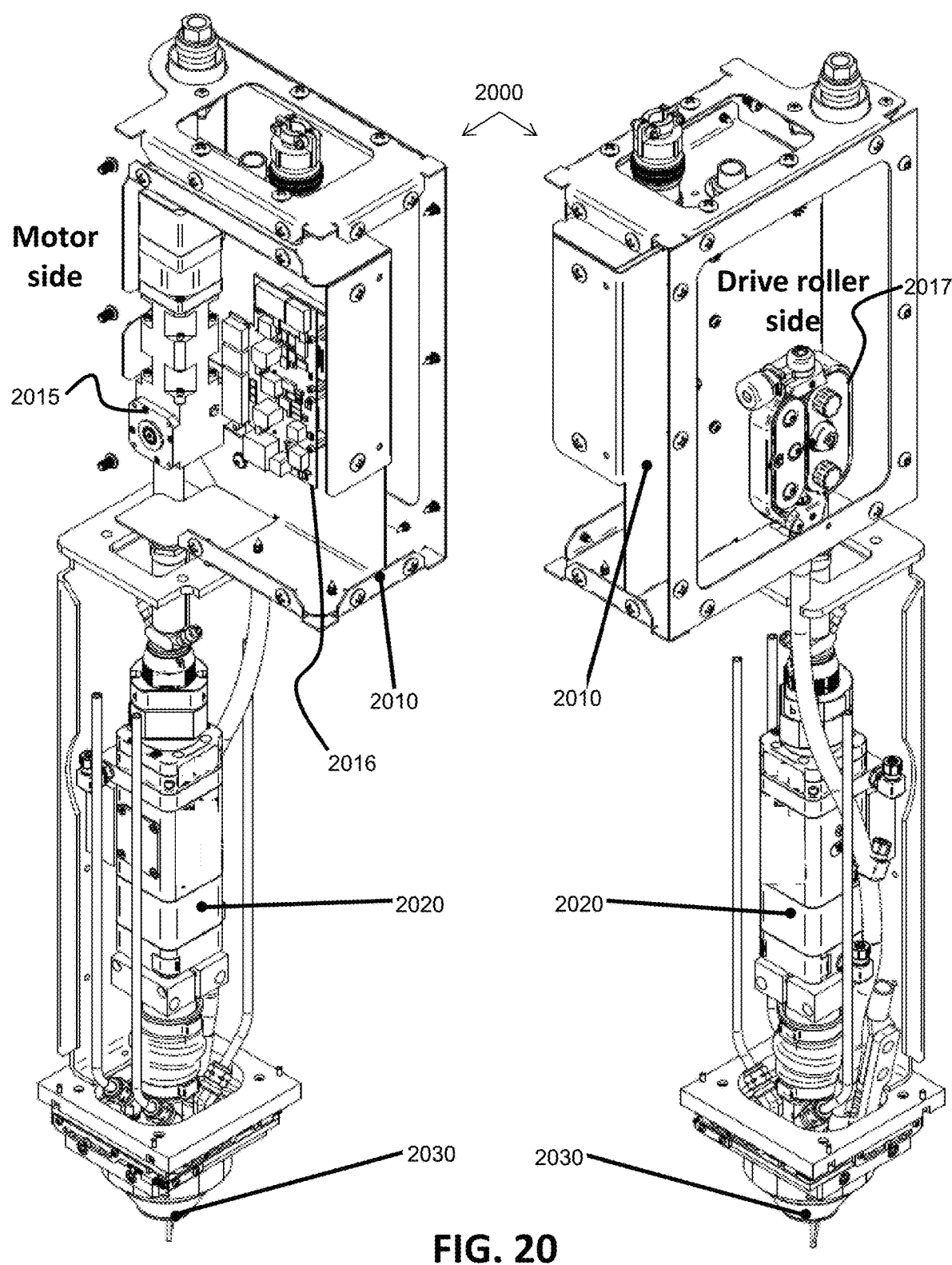
FIG. 20 illustrates two views of one embodiment of an integrated deposition head without all of the framing or covers attached.

FIG. 20 illustrates two views of one embodiment of an integrated deposition head 2000, without all of the framing or covers attached, and having an integrated wire feeder. The first view shows the deposition head 2000 from the motor side of the wire feeder 2010, having a motor 2015 and an integrated wire feeder circuit control board 2016 to control the motor 2015. In one embodiment, the board 2016 helps to control a "push-pull" wire feeding operation to maintain a same feed rate. In one embodiment, the board 2016 also serves to control a gas solenoid to control the flow of gas. The second view shows the deposition head 2000 from the drive roller side of the wire feeder 2010, having drive rollers 2017. A laser process sub-system 2020 is shown within an assembly below the wire feeder 2010 along with a nose cone 2030. In accordance with one embodiment, the laser process sub-system 2020 includes a laser focusing device operating in the infrared spectrum and providing an output power of between 1 to 15 kilowatts (kW). For example, at 4 kW, it is expected that deposition rates of between to 2.0 to 3.5 kilograms/hour can be achieved.

Figure 21:
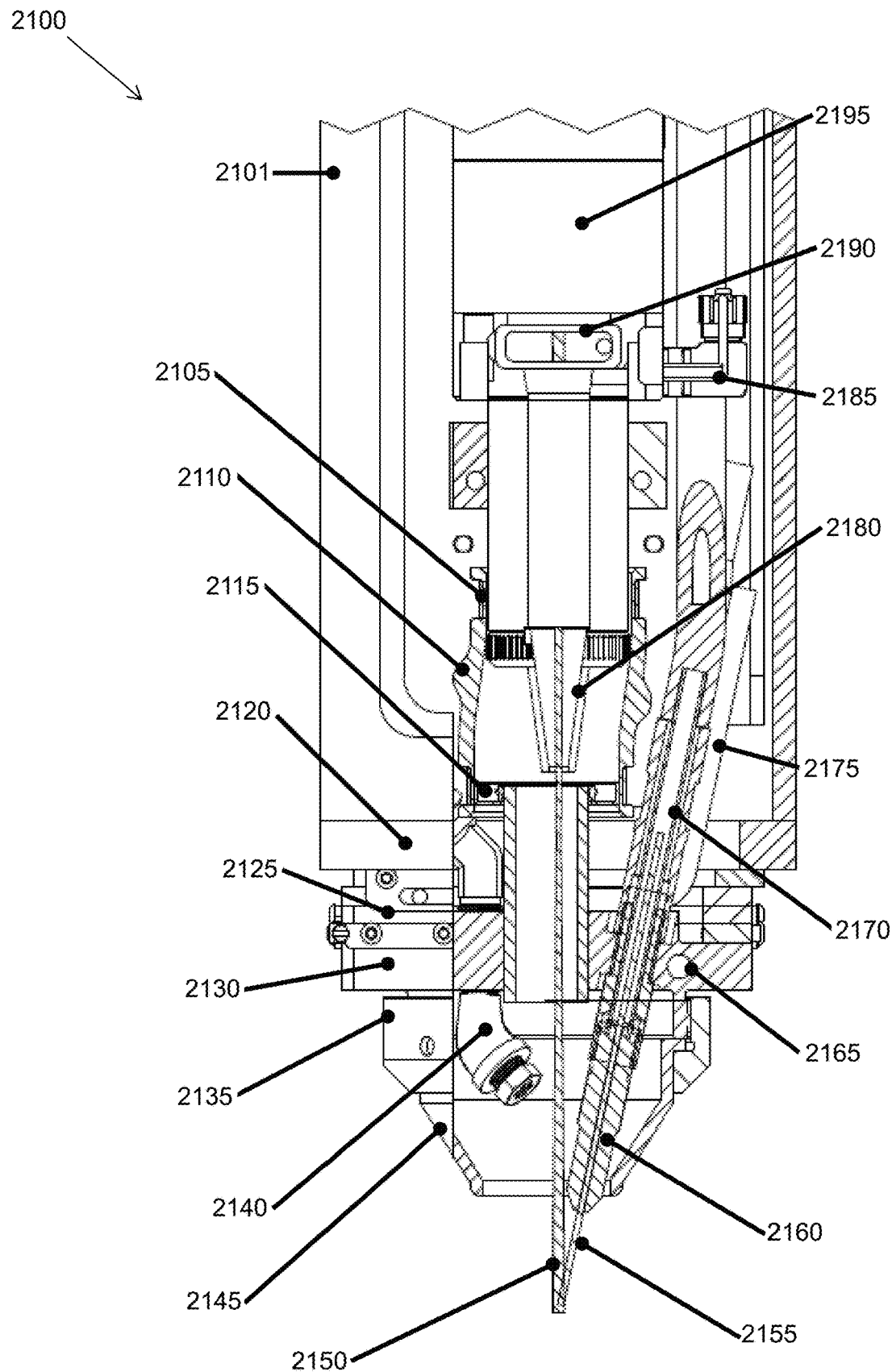
FIG. 21 illustrates one embodiment of an internal configuration of a portion of an integrated deposition head, similar to FIG. 5, showing various component details.

FIG. 21 illustrates one embodiment of an internal configuration of a portion 2100 of the integrated deposition head 2000 of FIG. 20, similar to FIG. 5, showing various component details. The portion 2100 includes a deposition head enclosure 2101, a clamp 2105, a flexible boot 2110, a clamp with seal 2115, and a thermally/electrically insulating plate 2120. The portion 2100 also includes a wire entry adjustment unit 2125, a water-cooled contact block 2130, a nose cone locking collar 2135, a supplemental/tip cooling gas conduit 2140, and a nose cone 2145. The portion 2100 produces and emits a laser light beam 2150 and feeds a filler wire 2155. The portion 2100 also includes a wire contact tip 2160, a cooling passage 2165, a wire conduit tube and liner 2170, and a hot wire process conductive lead (in background) 2175. In one embodiment, the conductive lead 2175 provides electric current to the wire conduit tube and liner 2170 and is water cooled, allowing the conductive lead 2175 to be of a relatively small diameter. The portion 2100 also includes a focusing optics outlet tip 2180, a focusing optics assist gas inlet 2185, an unperforated focusing optics cover slide 2190, and a laser light focusing optics module 2195.

The cover slide 2190 helps to prevent unwanted material/particles (e.g., spatter, fumes) from getting up into the focusing optics module 2195. Gas (e.g., argon) coming into the focusing optics assist gas inlet 2185 also helps to prevent unwanted material/particles (e.g., spatter, fumes) from getting up into the focusing optics module 2195. The clamp 2105, the clamp with seal 2115, and the flexible boot 2110 help to keep the gas sealed within the desired area of the portion 2100 without allowing surrounding ambient air to get in. This allows for moving of the nose cone part of the deposition head 2000 relative to the upper part of the portion 2100 for the purpose of moving the filler wire 2155 with respect to the laser light beam 2150. The water-cooled contact block 2130 has a passage 2165 within the block to allow circulation of fluid (e.g., water) to cool the nose cone area.

The insulating plate 2120 serves a primary purpose of preventing electrical conduction back through the structural frame of the additive deposition head and through the robot, controller, or allied system wiring. The wire entry adjustment unit 2125 allows for fine tuning of the infeed angle of the deposition process, where specific applications may show slight deposition performance benefits at slightly different infeed angles due to differences in physical and thermal properties of the various alloys employed by the process. The nose cone locking collar 2135 allows various nose cones to be removed/installed (e.g., via a threaded connection). The supplemental/tip cooling gas conduit 2140 provides gas to help cool the contact tip area and flood that area with the gas. In general, the gas from the supplemental/tip cooling gas conduit 2140 will be cooler, within the nose cone area, than the gas coming from the gas inlet 2185. The holes or orifices at the end of the supplemental/tip cooling gas conduit 2140 act to focus the gas to form a straight stream of gas. The focusing optics outlet tip 2180 helps to create a blast of gas to help prevent material/particles (e.g., splatter, fumes) from getting back to the laser light focusing optics module 2195.

Figure 22:
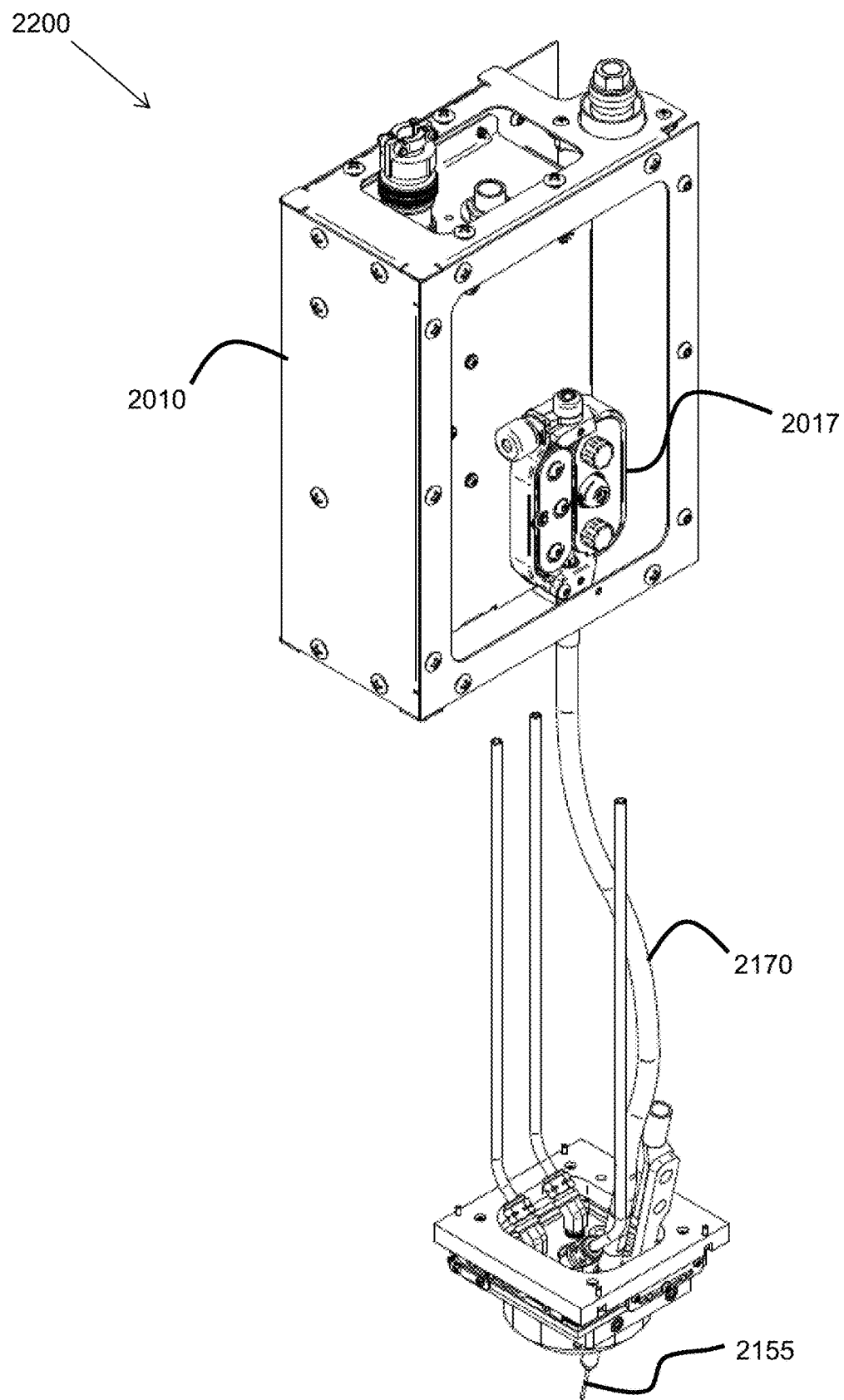
FIG. 22 illustrates a hot wire process sub-system of one embodiment of an integrated deposition head.
Figure 23:
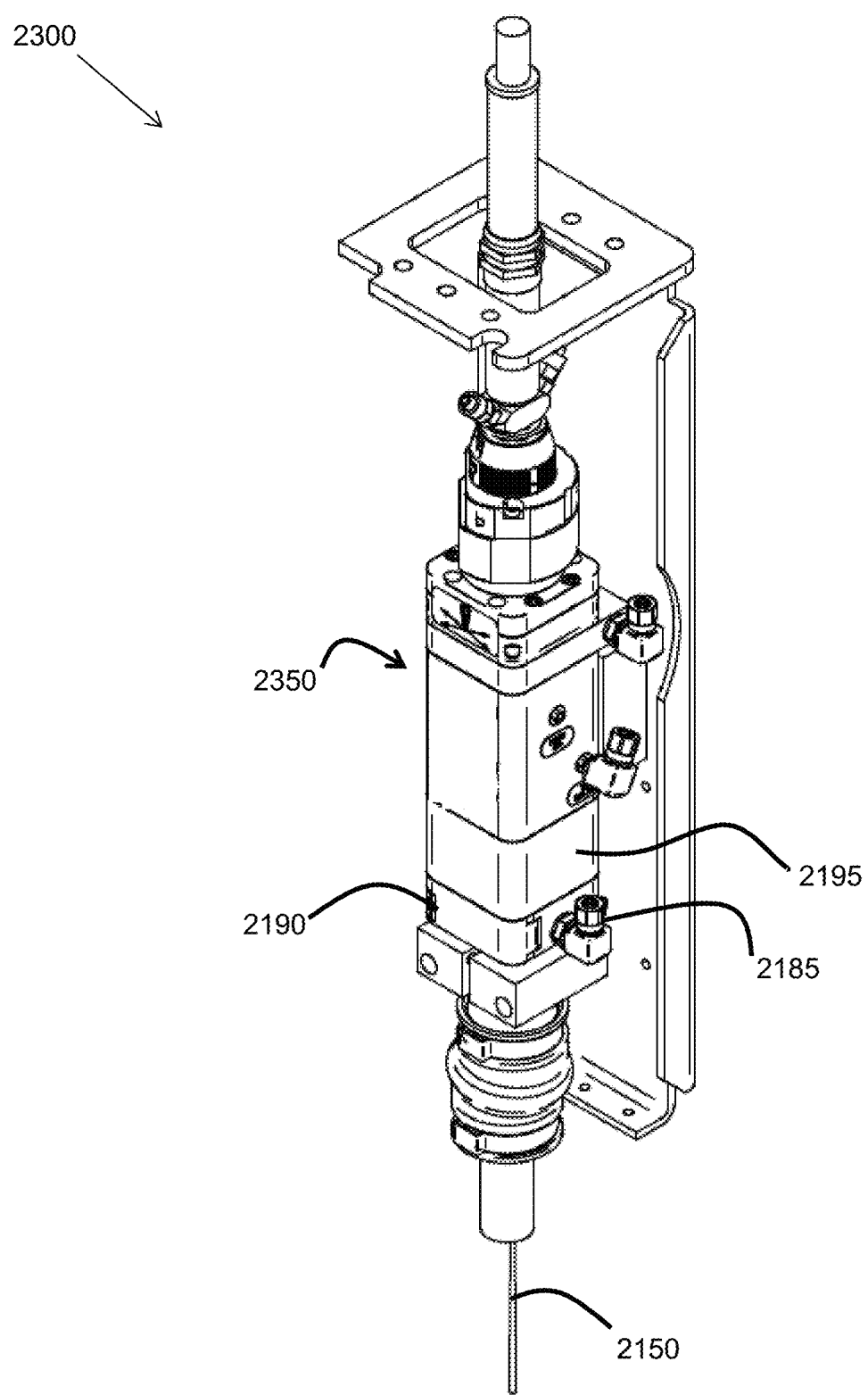
FIG. 23 illustrates a laser process sub-system of one embodiment of an integrated deposition head.
Figure 24:
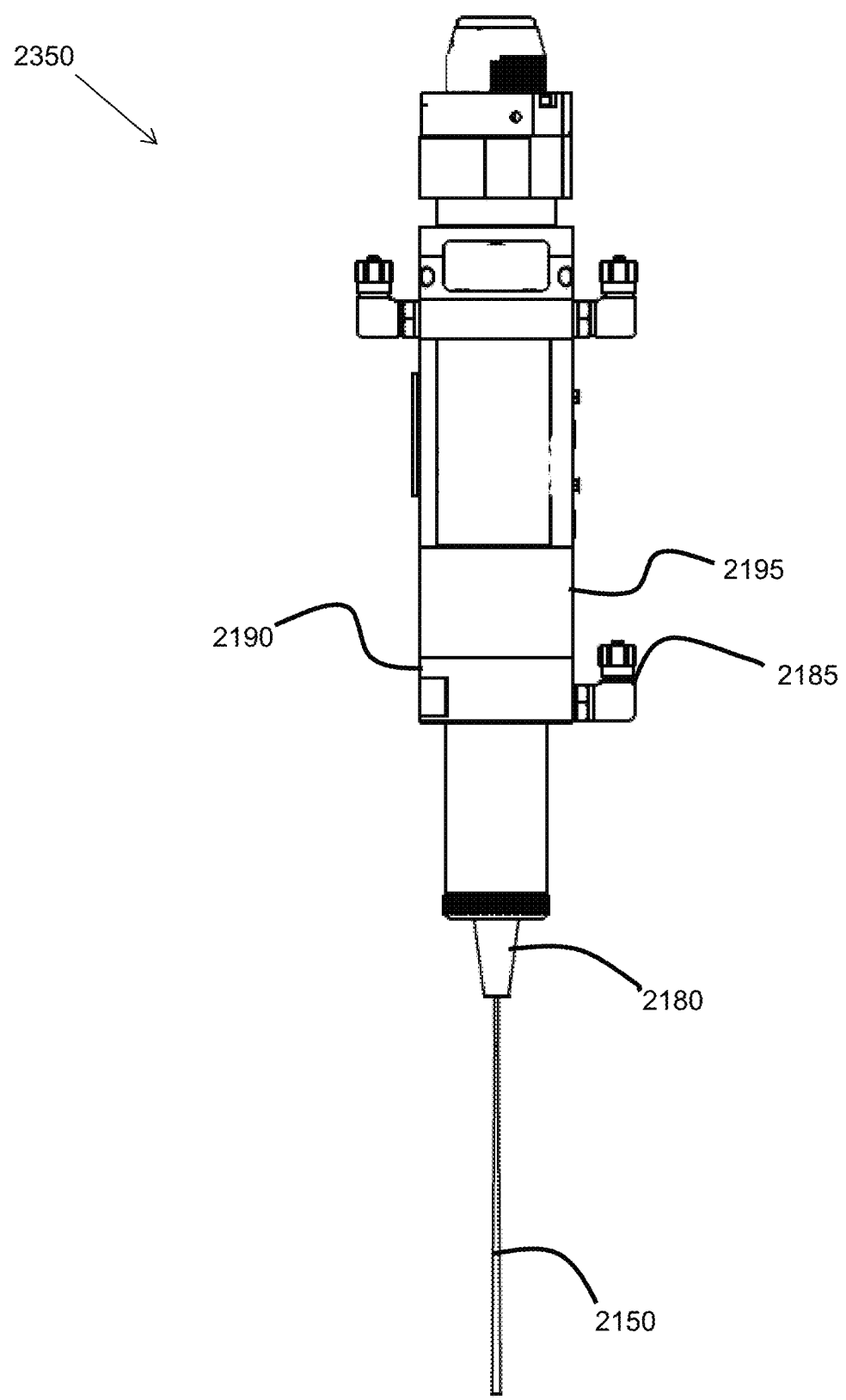
FIG. 24 illustrates one embodiment of a laser focusing device of the laser process sub-system of FIG. 23.
Figure 25:
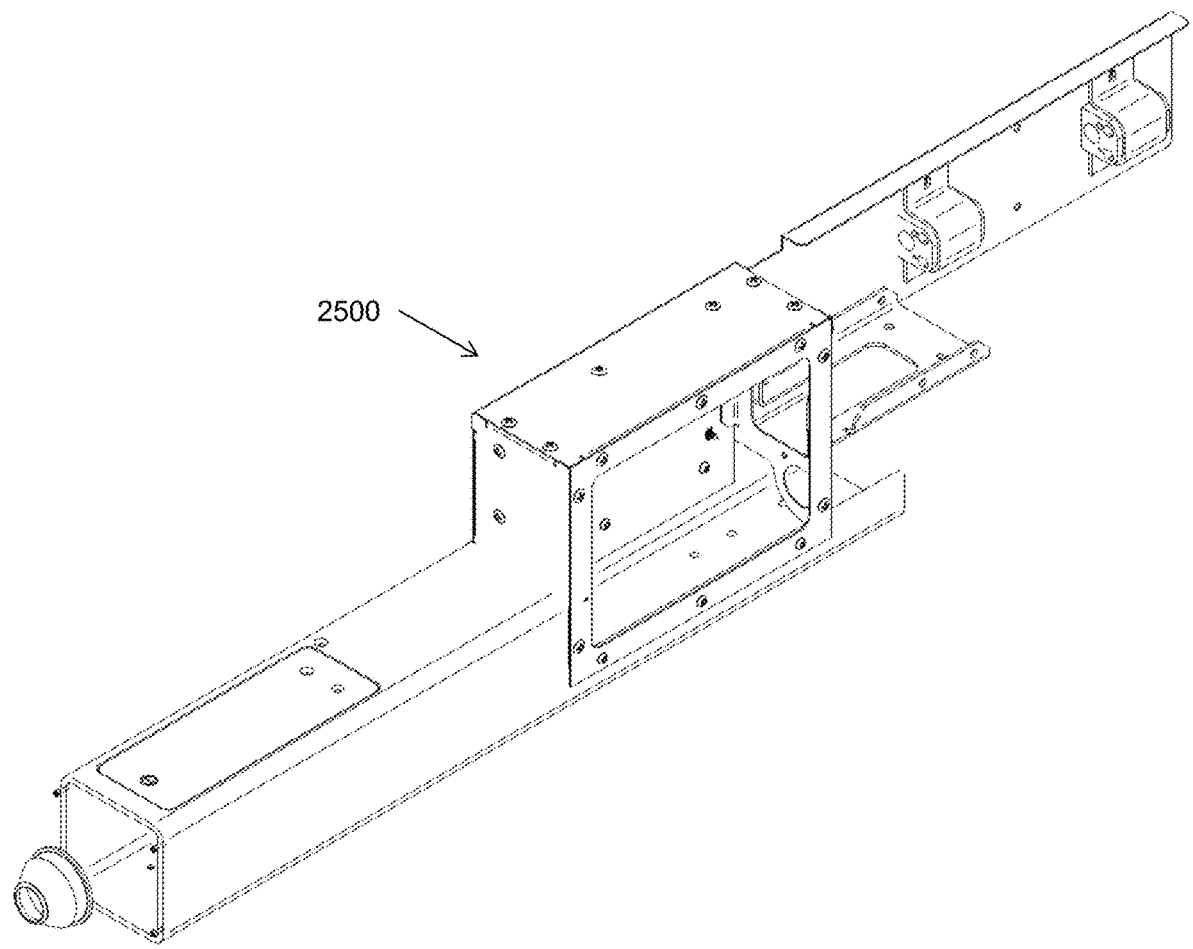
FIG. 25 illustrates a deposition head structural frame of one embodiment of an integrated deposition head.

FIG. 22 illustrates a hot wire process sub-system 2200, of one embodiment of the integrated deposition head 2000, having the wire feeder 2010 with the drive rollers 2017. The wire process sub-system 2200 is configured to feed the filler wire 2155 through the wire conduit and tube liner 2170 to achieve an angle with respect to the longitudinal direction (e.g., vertical direction) as previously described herein. FIG. 23 illustrates a laser process sub-system 2300, of one embodiment of the integrated deposition head 2000, showing a laser focusing device 2350 having the laser light focusing optics module 2195, the focusing optics cover slide 2190 (unperforated), and the focusing optics assist gas inlet 2185. The laser process sub-system 2300 is configured to produce the laser beam 2150. FIG. 24 illustrates one embodiment of the laser focusing device 2350, of the laser process sub-system 2300 of FIG. 23, showing the laser light focusing optics module 2195, the focusing optics assist gas inlet 2185, the focusing optics cover slide 2190, and the focusing optics outlet tip 2180. FIG. 25 illustrates a deposition head structural frame 2500, of one embodiment of the integrated deposition head 2000, configured to enclose the internal components of the integrated deposition head 2000. In one embodiment, the structural frame 2500 includes removable covers configured to allow access to certain internal components of the integrated deposition head 2000.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. An integrated laser hotwire additive deposition head, the deposition head comprising:
   a structural frame;
   a laser process sub-system, including a laser focusing device, mounted within the frame and configured to deliver a single beam path laser beam in a longitudinally-oriented direction toward a substrate or a part to be additively manufactured; and
   a wire feeding device and a contact tube mounted within the frame and configured to feed a consumable filler wire toward the substrate or the part at a first angle which can be adjusted over a range of 1° to 30° with respect to the longitudinally-oriented direction,
   wherein the deposition head is configured to have the consumable filler wire approach the contact tube at the first angle and exit the contact tube at a second angle of 1 to 5 degrees from the longitudinally-oriented direction over the range of the first angle, allowing the deposition head to be moved omni-directionally with respect to the substrate or the part, under guidance of a motion control system, to additively manufacture the part without having to:
      angularly change an orientation of the single beam path laser beam from the longitudinally-oriented direction, or
      rotate the deposition head.

2. The integrated laser hotwire additive deposition head of claim 1, wherein the first angle is manually adjustable between 1° and 30°.

3. The integrated laser hotwire additive deposition head of claim 1, wherein a distance between a first position, where the laser beam converges with the substrate or the part, and a second position, where a tip of the consumable filler wire converges with the substrate or the part, is manually adjustable.

4. The integrated laser hotwire additive deposition head of claim 1, wherein the single beam path laser beam is not split or recombined within the integrated laser hotwire additive deposition head.

5. The integrated laser hotwire additive deposition head of claim 1, further comprising a nose cone, utility hoses and conduits, and a water-cooled contact block.

6. The integrated laser hotwire additive deposition head of claim 1, wherein the wire feeding device includes a motor and drive rollers.

7. The integrated laser hotwire additive deposition head of claim 1, wherein the laser focusing device operates in the infrared spectrum providing an output power of up to 15 kilowatts.

8. The integrated laser hotwire additive deposition head of claim 1, wherein at least the wire feeding device and the contact tube are configured to provide deposition rates of up to 10.0 kilograms per hour.

9. The integrated laser hotwire additive deposition head of claim 1, wherein the laser focusing device includes at least one of a laser light focusing optics module, a focusing optics assist gas inlet, an unperforated focusing optics cover slide, and a focusing optics outlet tip.

10. An integrated laser hotwire additive deposition head, the deposition head comprising:
    a structural frame;
    a laser process sub-system, including a laser focusing device, mounted within the frame and configured to deliver a single beam path laser beam in a longitudinally-oriented direction toward a substrate or a part to be additively manufactured; and
    a contact tube mounted within the frame and configured to accept a consumable filler wire from an external wire feeding device and guide the consumable filler wire toward the substrate or the part at a first angle which can be adjusted over a range of 1° to 30° with respect to the longitudinally-oriented direction,
    wherein the deposition head is configured to have the consumable filler wire approach the contact tube at the first angle and exit the contact tube at a second angle of 1 to 5 degrees from the longitudinally-oriented direction over the range of the first angle, allowing the deposition head to be moved omni-directionally with respect to the substrate or the part, under guidance of a motion control system, to additively manufacture the part without having to:
       angularly change an orientation of the single beam path laser beam from the longitudinally-oriented direction, or
       rotate the deposition head.

11. The integrated laser hotwire additive deposition head of claim 10, wherein the first angle is manually adjustable between 1° and 30°.

12. The integrated laser hotwire additive deposition head of claim 10, wherein a distance between a first position, where the laser beam converges with the substrate or the part, and a second position, where a tip of the consumable filler wire converges with the substrate or the part, is manually adjustable.

13. The integrated laser hotwire additive deposition head of claim 10, wherein the single beam path laser beam is not split or recombined within the integrated laser hotwire additive deposition head.

14. The integrated laser hotwire additive deposition head of claim 10, further comprising a nose cone, utility hoses and conduits, and a water-cooled contact block.

15. The integrated laser hotwire additive deposition head of claim 10, wherein the laser focusing device operates in the infrared spectrum providing an output power of up to 15 kilowatts.

16. The integrated laser hotwire additive deposition head of claim 10, wherein the laser focusing device includes at least one of a laser light focusing optics module, a focusing optics assist gas inlet, an unperforated focusing optics cover slide, and a focusing optics outlet tip.

17. The integrated laser hotwire additive deposition head of claim 10, further comprising at least one of a thermally/ electrically insulating plate, a wire-entry adjustment unit, a nose cone locking collar, and a supplemental/tip cooling gas conduit.

\* \* \* \* \*